(12) United States Patent  
Lango et al.

(10) Patent No.: US 7,054,911 B1  
(45) Date of Patent: May 30, 2006

(54) STREAMING MEDIA BITRATE SWITCHING METHODS AND APPARATUS

(75) Inventors: Jason Lango, Mountain View, CA (US); Konstantinos Roussos, Sunnyvale, CA (US); Robert Tsai, Atlanta, GA (US); J. Christopher Wagner, Langley, WA (US)

(73) Assignee: Network Appliance, Inc., Sunnyvale, CA (US)

( * ) Notice: Subject to any disclaimer, the term of this patent is extended or adjusted under 35 U.S.C. 154(b) by 798 days.

(21) Appl. No.: 09/981,672

(22) Filed: Oct. 16, 2001

Related U.S. Application Data

(60) Provisional application No. 60/297,943, filed on Jun. 12, 2001.

(51) Int. Cl. *G06F 15/16* (2006.01)
(52) U.S. Cl. .................................. 709/213; 709/231
(58) Field of Classification Search ............. 709/213, 709/231
See application file for complete search history.

(56) References Cited

U.S. PATENT DOCUMENTS

| | | | |
|---|---|---|---|
| 5,043,885 A | 8/1991 | Robinson |
| 5,586,264 A | 12/1996 | Belknap et al. |
| 5,615,362 A | 3/1997 | Jensen et al. |
| 5,737,747 A | 4/1998 | Vishlitzky et al. |
| 5,799,185 A | 8/1998 | Watanabe |
| 5,854,887 A | 12/1998 | Kindell et al. |
| 5,918,020 A | 6/1999 | Blackard et al. |
| 5,960,452 A | 9/1999 | Chi |
| 6,085,193 A | 7/2000 | Malkin et al. |
| 6,351,471 B1 | 2/2002 | Robinett et al. |
| 6,351,474 B1 | 2/2002 | Robinett et al. |
| 6,366,970 B1 | 4/2002 | Wolff et al. |
| 6,407,680 B1 | 6/2002 | Lai et al. |
| 6,463,508 B1 | 10/2002 | Wolf et al. |
| 6,484,212 B1 | 11/2002 | Markowitz et al. |
| 6,505,169 B1 * | 1/2003 | Bhagavath et al. ........... 705/14 |
| 6,516,361 B1 | 2/2003 | Lym et al. |
| 6,593,860 B1 | 7/2003 | Lai et al. |
| 6,594,751 B1 | 7/2003 | Leivent |
| 6,665,755 B1 | 12/2003 | Modelski et al. |
| 6,708,213 B1 | 3/2004 | Bommaiah et al. |
| 6,721,850 B1 | 4/2004 | Hofmann et al. |
| 6,742,082 B1 | 5/2004 | Lango et al. |
| 6,744,763 B1 | 6/2004 | Jones et al. |
| 6,747,991 B1 | 6/2004 | Hemy et al. |
| 6,760,765 B1 | 7/2004 | Asai et al. |
| 2001/0003193 A1 | 6/2001 | Woodring et al. |
| 2001/0034786 A1 | 10/2001 | Baumeister et al. |
| 2002/0029282 A1 | 3/2002 | Buddhikot et al. |

(Continued)

OTHER PUBLICATIONS

NetCache™ 5.1 Accelerator First-Time Configuration Guide, Network Appliance, Inc., Sunnyvale, California, Apr. 2001.

(Continued)

*Primary Examiner*—Kevin Verbrugge  
(74) *Attorney, Agent, or Firm*—Blakely, Sokoloff, Taylor & Zafman LLP

(57) ABSTRACT

A method for operating a streaming media cache includes receiving a series of streaming media data packets from an upstream server, each of the series of streaming media data packets having media data encoded in one of a plurality of encoding formats, forming bundles of data packets from the series of streaming media data packets, and storing bundles of data packets into a disk memory when every data packet within each bundle have a similar encoding format.

24 Claims, 14 Drawing Sheets

U.S. PATENT DOCUMENTS

| | | |
|---|---|---|
| 2002/0097750 A1 | 7/2002 | Gunaseelan et al. |
| 2002/0116473 A1 | 8/2002 | Gemmell |
| 2002/0116585 A1 | 8/2002 | Scherr |
| 2002/0162047 A1 | 10/2002 | Peters et al. |
| 2002/0181506 A1 | 12/2002 | Loguinov |
| 2003/0217113 A1 | 11/2003 | Katz et al. |
| 2004/0039837 A1 | 2/2004 | Gupta et al. |

OTHER PUBLICATIONS

NetCacheTM 5.1 Configuration Guide, Network Appliance, Inc., Sunnyvale, California, Apr. 2001.

NetCacheTM 5.1 Deployment Planning Guide, Network Appliance, Inc., Sunnyvale, California, Apr. 2001.

NetCacheTM 5.1 Features and Configuration Planning Guide, Network Appliance, Inc., Sunnyvale, California, Apr. 2001.

NetCacheTM 5.1 Routine Administration Guide, Network Appliance, Inc., Sunnyvale, California, Apr. 2001.

NetCacheTM 5.1 Streaming Media Cache First-Time Configuration Guide, Network Appliance, Inc., Sunnyvale, California, Apr. 2001.

NetCacheTM 5.1 Web Cache First-Time Configuration Guide, Network Appliance, Inc., Sunnyvale, California, Apr. 2001.

* cited by examiner

DATA FORMAT HIERARCHY

STREAMING MEDIA BITRATE SWITCHING METHODS AND APPARATUS

CROSS-REFERENCE TO RELATED APPLICATIONS

The present application claims priority to Provisional U.S. Patent Application No. 60/297,943, filed on Jun. 12, 2001, and entitled, "Streaming Media Payload Storage Method and Apparatus," which is incorporated herein by reference for all purposes. U.S. patent application Ser. No. 09/981,668, entitled, "Caching Media Data Using Content-Sensitive Identifiers," filed on Oct. 16, 2001, and issued as U.S. Pat. No. 6,813,690 is also incorporated herein by reference for all purposes.

BACKGROUND OF THE INVENTION

The present invention relates to data caching. More particularly, the present invention relates to apparatus for caching streaming media and to methods of operation of streaming media caches.

Typical file caching methods include a cache receiving a file from a file server, and storing the entire file. Later, when a client desires the file, instead of serving the file from the file server, the file is served from the cache. Because the cache is typically a server that is closer to the client or has higher bandwidth than the file server, the file is served to the client quickly from the cache.

It has been discovered by the inventors, that attempting to apply typical file caching methods to files that include streaming media data, raises many new problems. For instance, serving a streaming media data file from a cache requires much more processing by the cache than with classical file transfers over the web. For example, during normal playback, the cache may need to perform a lot of processing such as packet modification, resequencing, and retiming. As another example, the cache may be called upon to perform random access within the streaming media data file as a result of a client "rewind" or "fast forward" operation. Because, classical caching is typically file-based, such a random access would involve moving within a very large data file.

Another drawback is that since streaming media data files are very large, a huge penalty is incurred if the streaming media data file is deleted. Typically if a file cache determines that it needs more disk space for new files, it will first delete older files, regardless of the size. As an example, if an older file is a streaming media data file that stores an hour-long program, the entire hour-long program is deleted even if the cache only needs to free up the equivalent of 1 minute of space.

Another drawback is that many different streaming media encodings formats exist, each with its own specific parameters or requirements. This is in contrast to classical file transfer over the web, where the files are essentially opaque to the cache and for streaming data to clients, the cache does not need to process the actual contents of the file beyond storage and retrieval.

Thus what is required are improved methods and apparatus for storing and serving streaming media within a cache. Further, what is required are methods and apparatus for providing such solutions in economical ways.

BRIEF SUMMARY OF THE INVENTION

The present invention relates to streaming media caches and methods of operation. More particularly, the present invention relates to methods for storing streaming media data of varying parameters within each stream and providing the data to client systems. Parameters that may vary within a stream may include the bitrate, a bit-depth, thinning parameters, output resolution, or the like.

In the present disclosure "Streaming media" data generally refers to media intended to be transported at a select (often, subscribed) bit rate, and with a desired timeliness. The streaming media is adapted for playback in a desired order without regard to the order the streaming media data are received by a client system. Streaming media generally conforms to a real-time delivery protocol, such as, e.g., RTSP, RTP, or the like. The media (media clip) represented in the streaming media data may include static images, video data, audio data, executable files, presentation data, applet data, data files, and the like.

The data that is cached in a streaming media cache may be an entire streaming media clip, portions of a streaming media clip, or the like. In the case where there is a streaming media cache hit, the portion of the streaming media stored in the streaming media cache is served to a client. In the case of a streaming media cache miss, the missing portion of a streaming media clip may be retrieved from a media server, instead of an entire streaming media clip. The missing portion of the streaming media clip that is retrieved from an upstream or origin server is then stored and then served to a client.

Storing a streaming media clip in the efficient method described below allows the streaming media cache to maintain portions of a streaming media clip that are often requested, and to flush portions of the streaming media clip that are not often requested. Further, it allows the streaming media cache to store only portions of streaming media clips. For example, a first third of a streaming media clip in a first encoding scheme, a second third in a second encoding scheme, and the last third in a third encoding scheme. The embodiments below describe storing "data chunks" in a memory when all data packets store therein are of the same encoding scheme. Data chunks that store data packets in multiple encoding schemes typically represent transition periods between and among cache hit states, cache miss states, and "disk miss" states. Accordingly such data chunks may be deleted or not written to disk.

According to an aspect of the invention, a method for operating a streaming media cache is disclosed. The technique may include receiving a series of data packets from an upstream server, each of the series of data packets having data encoded in one of a plurality of encoding formats, and forming bundles of data packets from the series of data packets. Additional process steps may include storing bundles of data packets into a disk memory when data packets in each bundle have a similar encoding format.

According to another aspect of the invention, a streaming media cache including disk memory is disclosed. One such system includes a buffer configured to receive a first plurality of data packets from a media server, the data packets comprising payload data and meta data, wherein the meta data for each data packet from the first plurality of data packets indicate a first encoding scheme for the payload data, wherein the buffer is also configured to receive the second plurality of data packets from the media server, wherein the meta data for each data packet from the second plurality of data packets indicate a second encoding scheme for the payload data, and wherein the buffer is configured to store a first set of data packets from a series of data packets comprising the first plurality of data packets and the second plurality of data packets. Other systems may also include a disk memory configured to store the fist set of data packets from the buffer when the meta data for each data packet in the first set of data packets indicates only one encoding scheme for the payload data in the first set of data packets.

According to yet another aspect of the invention, a method for storing data in a streaming media cache including disk memory is disclosed. One technique may include receiving a first plurality of data packets from an upstream server, the data packets comprising payload data and meta data, wherein the meta data for each data packet from the first plurality of data packets indicate a first encoding scheme for the payload data, and receiving a second plurality of data packets from the upstream server, the data packets comprising payload data and meta data, wherein the meta data for each data packet from the second plurality of data packets indicate a second encoding scheme for the payload data. Additional methods may include storing a first set of data packets in a buffer from a series of data packets comprising the first plurality of data packets and the second plurality of data packets, until the buffer is full, and storing the first set of data packets to the disk memory when the meta data for each data packet in the first set of data packets indicates only one encoding scheme for the payload data.

DETAILED DESCRIPTION OF THE INVENTION

Figure 1A:
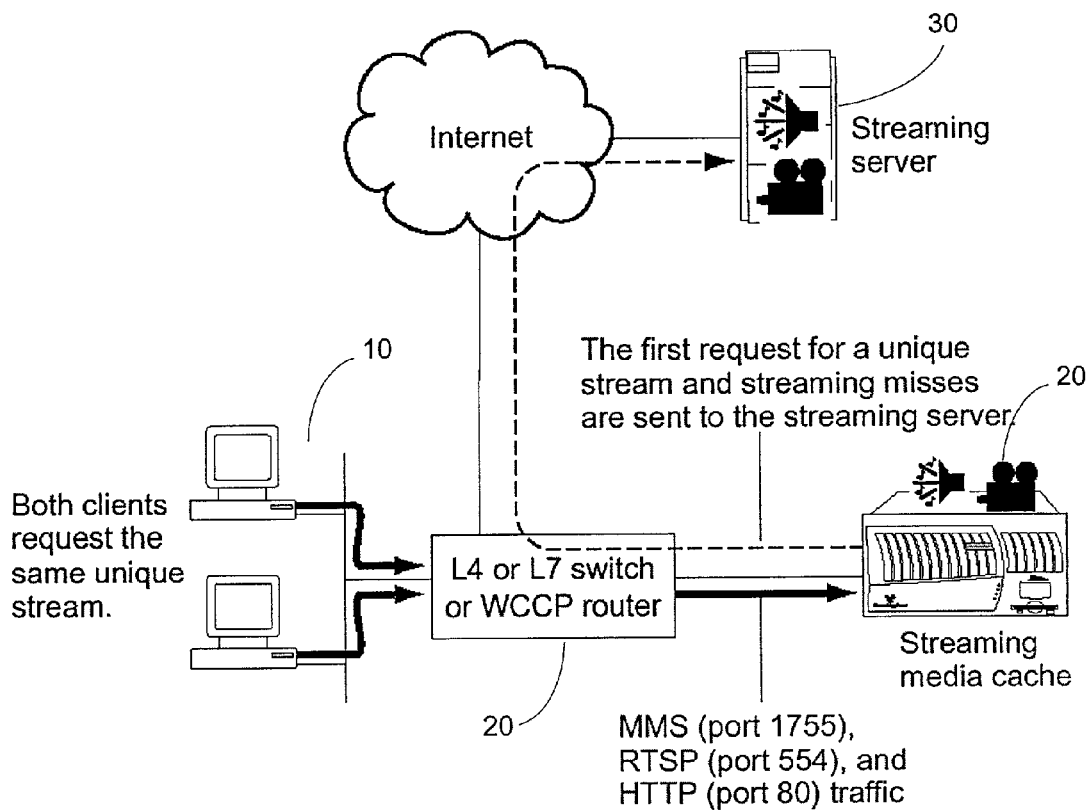
FIGS. 1A–E illustrate overview diagrams according to embodiments of the present invention.

FIG. 1A illustrates a overview diagram according to an embodiment of the present invention. In particular, FIG. 1A includes a client system 10, a streaming media cache (server) 20, media data server 30 (streaming server), and a router 40. The elements of FIG. 1A are coupled as disclosed over computer networks such as a local area network, wide area networks (Internet), wireless networks or the like.

In one embodiment, client system 10 initially makes a request for a stream of streaming media. The media (media clip) may include static images, video data, audio data, executable files, and the like. This request may take the form of a user clicking upon a URL on a web page, or the like. In this embodiment, this request is intercepted by router 40. Router 40 may be embodied as a layer 4 or layer 7 switch, a Web Cache Coordination Protocol (WCCP) router, or any other conventional switch or router. In such embodiments, router 40 would be configured to recognize when a request is made by client system 10 for a stream of streaming media.

If such a request is determined by router 40, that request is redirected to streaming media cache 20, and not media data server 30. Once streaming media cache 20 receives the request, it makes a determination whether the stream (the entire media clip) or the requested portion of the stream (the request portion of the media clip) has already been cached. If the data has been previously stored, streaming media cache 20 provides the streaming media to client system 10.

In the present embodiment, if the data (requested portion of a stream) has not previously been stored in streaming media cache 20, streaming media cache 20 sends a request to media server 30 for a stream of data including the requested portion of a stream. As the requested portion of the stream of data are delivered to streaming media cache 20, it is forwarded to client system 10, and the portion of the stream of data are stored.

For this embodiment, the streaming media traffic is received by media cache 20 from specific ports. In specific embodiments, for RealNetworks RealSystem streaming media, media cache 20 receives streaming media via TCP on port 554; for QuickTime (RTSP) streaming media, media cache 20 receives streaming media via TCP on port 554 and/or via UDP on port 2001; for Microsoft Media Streaming (MMS) streaming media, media cache 20 receives streaming media data via TCP on port 1755; and for HTTP streaming media, media cache 20 receives streaming media data via TCP on port 80, or the like. In other embodiments, other ports for the streaming media may also be used.

Figure 1B:
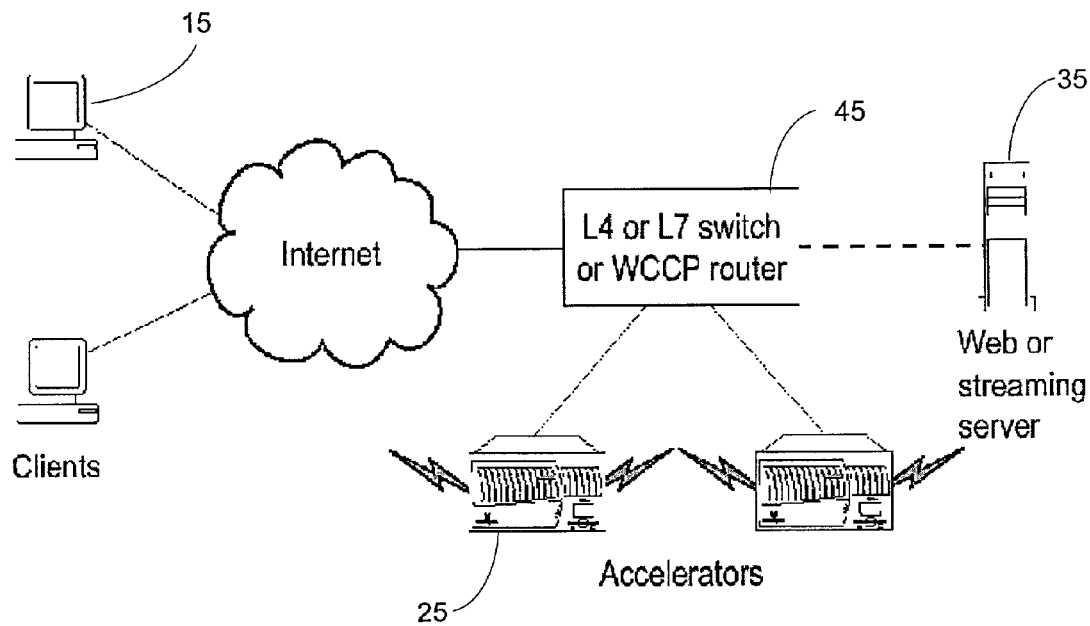

The embodiment illustrated above is configured to be accessible from client system 10 via a local area network. It should be understood that streaming media cache 20 may be alternatively positioned at other points in the network, for example, at the edge of a point of presence network on the Internet, and the like. An example is illustrated in FIG. 1B FIG. 1B illustrates a overview diagram according to another embodiment of the present invention. In particular, FIG. 1B includes a client system 15, a streaming media cache (server) 25, media data server 35 (streaming server), and a router 42. The elements of FIG. 1B are coupled as disclosed over computer networks such as a local area network, wide area networks (Internet), wireless networks or the like. In this embodiment, streaming media cache 25 may be embodied as an accelerator on the edge of a point of presence (POP).

In this embodiment, client system 15 initially makes a request for a stream of streaming media (representing a streaming media clip). This request may take the form of a user clicking upon a URL on a web page, or the like. In this embodiment, the request is passed over the wide area network and is intercepted by router 42. Router 42 may be embodied as a layer 4 or layer 7 switch, a WCCP router, or any other conventional switch or router. In this embodiments, router 42 would be configured to recognize when a request is made by client system 10 for a stream of streaming media.

If such a request is determined by router 42, that request is redirected to streaming media cache 25, and not media data server 35. Once streaming media cache 25 receives the request, it makes a determination whether the streaming media clip or the requested portion of the streaming media clip has already been cached. If the data has been previously stored, streaming media cache 25 provides the streaming media to client system 10.

In the present embodiment, if the data has is not stored in streaming media cache 25, streaming media cache 25 sends a request to media server 35 for the missing data. As the stream of data (including the portion of the streaming media clip) is delivered to streaming media cache 25, it is forwarded to client system 15. The missing portion of the streaming media clip is then stored in streaming media cache 25. Details of the storage format and the process of storing and retrieving the stream of data are described in greater detail below.

For this embodiment, the streaming media traffic is sent by media cache 20 to specific ports. In specific embodiments, for RealSystem streaming media, media cache 20 sends streaming media via TCP on port 554; for QuickTime (RTSP) streaming media, media cache 20 sends streaming media via TCP on port 554 and/or via UDP on port 2001; for Microsoft Media Streaming (MMS) streaming media, media cache 20 sends streaming media data via TCP on port 1755; and for HTTP streaming media, media cache 20 sends streaming media data via TCP on port 80, or the like. In other embodiments, other ports for the streaming media may also be used.

In other embodiments of the present invention, one or more streaming media caches may be positioned simultaneously at the illustrated locations between client system 15 and media server 35. Additional streaming media caches may also be positioned at other locations between client system 15 and media server 35, for example at a user ISP, on an intranet, and the like. In light of this disclosure, it will be apparent that many other network configurations can incorporate embodiments of the present invention.

Figure 1C:
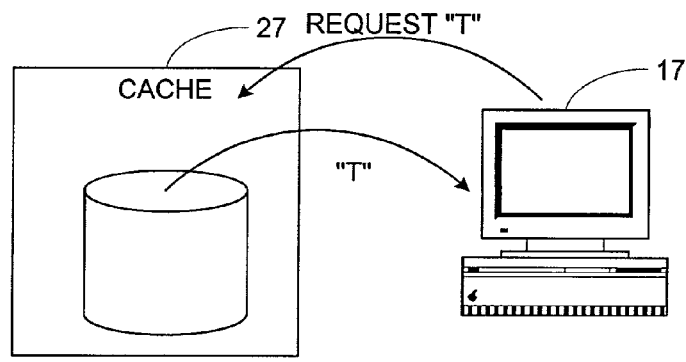
Figure 1D:
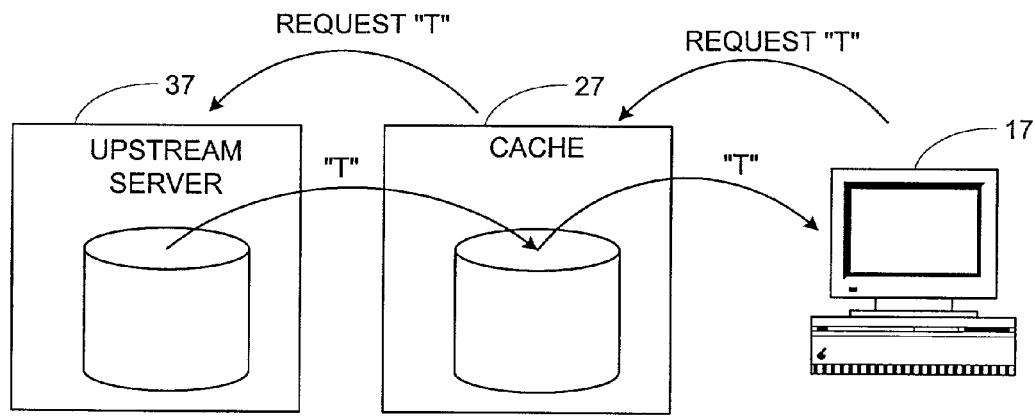
Figure 1E:
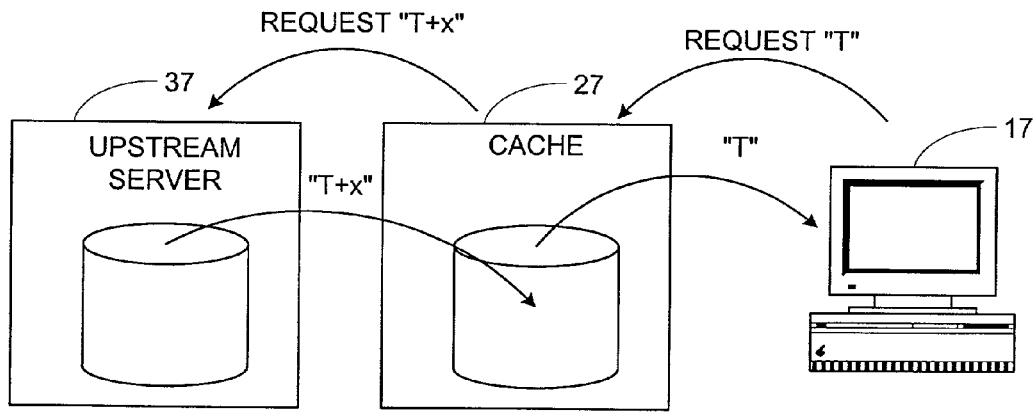

FIGS. 1C–1E illustrate three different states for providing data from a streaming media cache to a client system.

The first state, illustrated in FIG. 1C, describes a "pure cache hit", or simply a "hit." Initially, a client system 17 requests streaming media data of a first encoding from streaming media cache 27 beginning "presentation time" T. As will be discussed further below, in the present disclosure, a "presentation time" is the time within a media stream. Merely as an example, a beginning of a one hour movie that is streamed may have a presentation time of 0, and the middle of the one hour movie may have a presentation time of 30 minutes.

Next, in response to the request from client system 17, streaming media cache 27 determines that it has the requested streaming media data beginning presentation time T and provides the streaming data back to client system 17. In this embodiment, streaming media cache 27 also "looks ahead" until presentation time T+α in its memory and determines that it can provide the streaming media data at least until presentation time T+a.

The second state, illustrated in FIG. 1D, describes a "pure cache miss", or simply a "miss." In this case, a client system 17 requests streaming media data of a first encoding from streaming media cache 27 beginning presentation time T. However streaming media cache 27 determines that it does not have the requested streaming media data for presentation time T. Streaming media cache 27 therefore asks for and receives the requested streaming media data from an origin (upstream) server 37 beginning at presentation time T.

In this embodiment, the requested streaming media data beginning at presentation time T is then provided to client system 17. The streaming media data is also stored within streaming media cache 27. This data is then available in streaming media cache 27 for a subsequent client system request.

The third state, illustrated in FIG. 1E, describes a "disk" cache miss, or simply a "disk miss." Initially, a client system 17 requests streaming media data of a first encoding from streaming media cache 27 beginning presentation time T. In response, streaming media cache 27 determines that it has the requested streaming media data beginning presentation time T. Streaming media cache 27 thus provides this data back to client system 17.

In this state, streaming media cache 27 "looks ahead" in its memory and determines whether it can provide the requested media data in the future. In one case, streaming media cache 27 may determine that it can not provide the requested streaming media data to client system 17 at presentation time T+δ. Examples of when this may occur may include if only a portion of a data stream were originally cached; if the entire data stream were originally present but certain portions were flushed or ejected from streaming media cache; if streaming media cache 27 labels a packet a "scratch" or invalid data packet; or combinations of the above.

Next, in the present embodiment, streaming media cache 27 asks for and receives the requested streaming media data from an origin server 37 beginning at presentation time T+δ. Thus, while streaming media cache 27 is providing the streaming data back to client system 17 beginning presentation time T, streaming media cache 27 is pre-storing streaming data in a disk memory beginning from presentation time T+δ.

A discussion of what happens when streaming media cache 27 switches between the above states will be described later in this disclosure.

Figure 2:
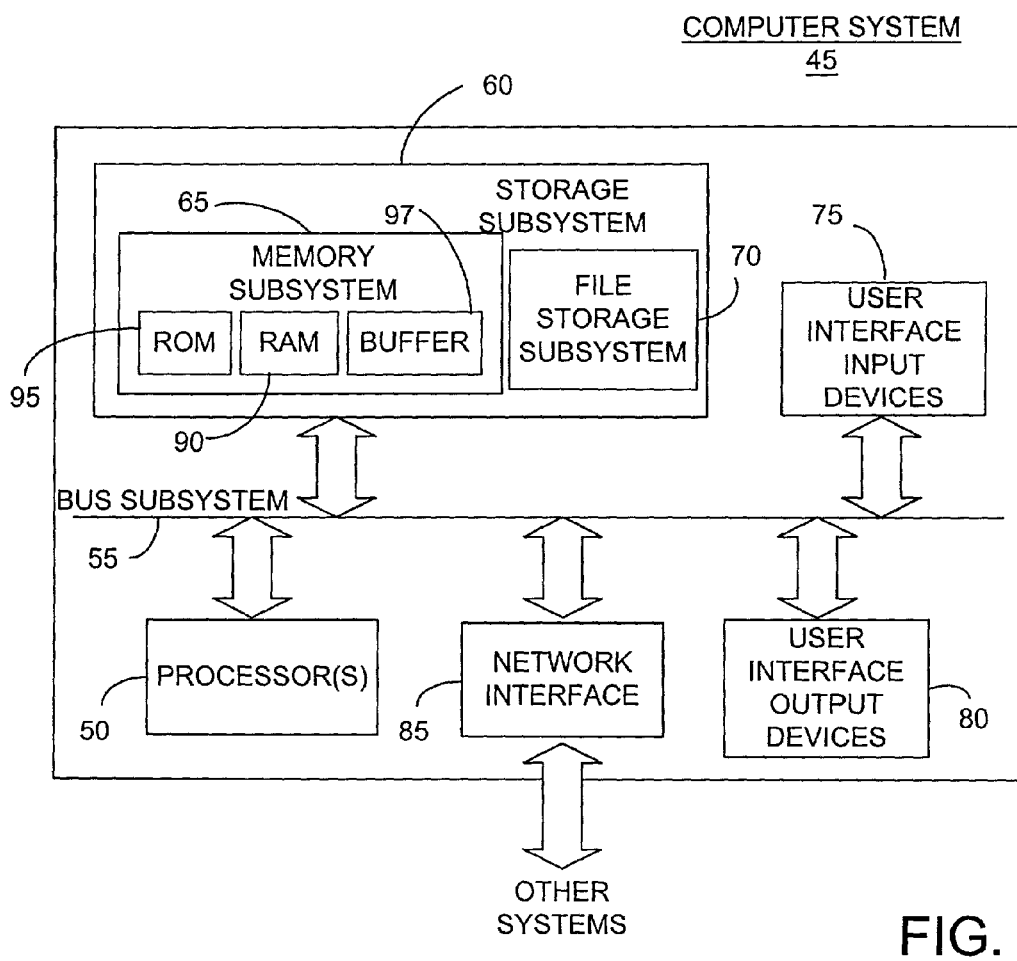
FIG. 2 is a simplified block diagram of a computer system according to an embodiment of the present invention.

FIG. 2 is a simplified block diagram of a computer system 45 according to an embodiment of the present invention. Computer system 45 may be used as client system 10, streaming media cache 20, and/or media data server system 30. Computer system 45 may be a stand-alone computer system, a computer "appliance," or the like.

As shown in FIG. 2, computer system 45 includes at least one processor 50, which communicates with a number of peripheral devices via a bus subsystem 55. These peripheral devices may include a storage subsystem 60, comprising a memory subsystem 65 and a file storage subsystem 70 user interface input devices 75, user interface output devices 80, and a network interface subsystem 85. The input and output devices allow user interaction with computer system 45. A user may be a human user, a device, a process, another computer, and the like.

Network interface subsystem 85 provides an interface to other computer systems. Embodiments of network interface subsystem 85 include an Ethernet card, a modem (telephone, satellite, cable, ISDN), (asynchronous) digital subscriber line (DSL) units, and the like. Network interface 250 is coupled to a typical network as shown.

User interface input devices 75 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 50.

User interface output devices 80 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 45.

Storage subsystem 60 may be configured to store the basic programming and data constructs that provide the functionality of the computer system and of the present invention. For example, according to an embodiment of the present invention, software modules implementing the functionality of the present invention may be stored in storage subsystem 60. These software modules may be executed by processor(s) 50 of computer system 45. In a distributed environment, the software modules may be stored on a plurality of computer systems and executed by processors of the plurality of computer systems. Storage subsystem 60 may also provide a repository for storing various databases that may be used to store information according to the teachings of the present invention. For example, a cache entry hash table, discussed below, may be stored in storage subsystem 60 of media server 30. Storage subsystem may also function as a cache of streaming media cache 20. Storage subsystem 60 may comprise memory subsystem 65 and file storage subsystem 70.

Memory subsystem 65 may include a number of memories including a main random access memory (RAM) 90 for storage of instructions and data during program execution and a read only memory (ROM) 95 in which fixed instructions are stored. RAM 90 is typically also used for execution of programs, storage of data, and the like.

File storage subsystem 70 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

A memory buffer 97 is also provided in storage subsystem 60. In this embodiment, memory buffer 97 is a special buffer memory coupled to file storage subsystem 70. More specifically, memory buffer 97 provides a temporary storage area for data retrieved from and data sent to file storage subsystem 70. Memory buffer 97 may also provide a temporary storage area for data received from a streaming media server (or other upstream server) and for data to be sent to client systems. As will be discussed below, the type of data may include streaming media payload data.

In the present embodiment, computer system 45 typically also includes software that enables it to send and receive data and communications to and from client systems 10 and media data server 30 using communications protocols including, HTTP, S-HTTP, TCP/IP, UDP, SSL, RTP/RTSP and the like. In alternative embodiments of the present invention, other software and transfer and communication protocols may also be used, for example IPX, UDP or the like.

Bus subsystem 55 provides a mechanism for letting the various components and subsystems of computer system 45 communicate with each other as intended. The various subsystems and components of computer system 45 need not be at the same physical location but may be distributed at various locations within a network. Although bus subsystem 55 is shown schematically as a single bus, alternative embodiments of the bus subsystem may utilize multiple busses.

Computer system 45 itself can be of varying types including a personal computer, a portable computer, a workstation, a computer terminal, a network computer, a mainframe, a kiosk, a personal digital assistant (PDA), a wireless communication device such as a cell phone, an entertainment console (PS2, X-box) or any other data processing system. Due to the ever-changing nature of computers and networks, the description of computer system 45 depicted in FIG. 1B is intended only as a specific example for purposes of illustrating an embodiment of the computer system.

In one embodiment, computer system 45 is embodied as a network cache (appliance) in a product called "NetCache" available from NetworkAppliance, Incorporated. The NetCache family of products currently includes the NetCache C1100, NetCache C3100, and NetCache C6100 including proprietary, but available hardware and software. Embodiments of the present invention may also be implemented in future additions to the NetCache family of products.

It will be readily apparent to one of ordinary skill in the art that many other hardware and software configurations are suitable for use with the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including WindowsNT™ from Microsoft, Solaris from Sun Microsystems, LINUX, UNIX, MAC OS X from Apple Computer Corporation, BeOS™, and the like. Many other configurations of a computer system are possible having more or fewer components than the computer system depicted in FIG. 1B.

Figure 3:
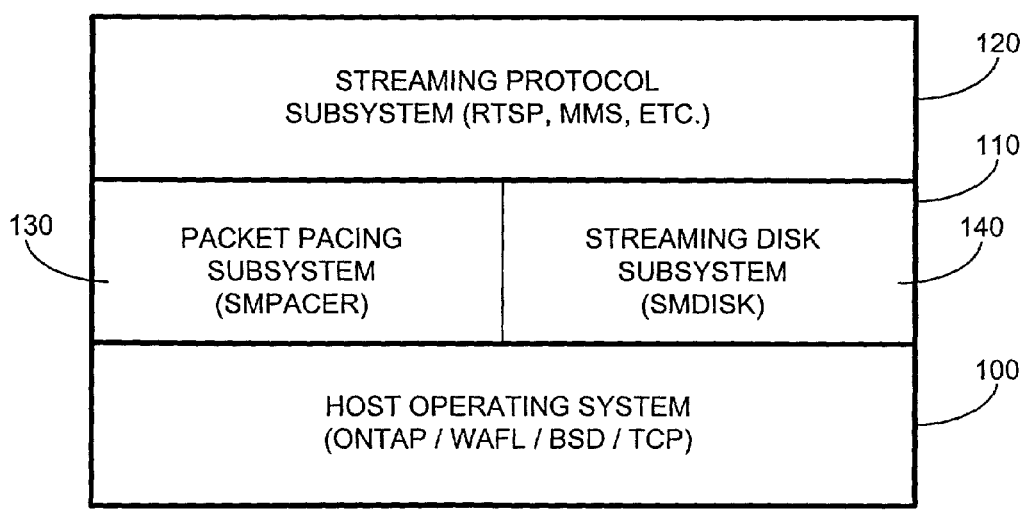
FIG. 3 illustrates a software hierarchy according to embodiments of the present invention.

FIG. 3 illustrates a software hierarchy according to embodiments of the present invention. In particular, FIG. 3 includes a three-tiered hierarchy including an operating system level (layer) 100, a data handling level (layer) 110, and a protocol level (layer) 120.

In the present embodiment, as illustrated, operating system level(layer) 100 includes portions of the Berkeley Software Distribution (BSD) operating system. Additionally, operating system level 100 includes software provided by the assignee of the present invention: Data ONTAP™, a Network Appliance brand operating system with Write Anywhere File Layout (WAFL™), a Network Appliance brand file system. In the present embodiment, the Data ONTAP™ operating system provides efficient file service by using file-system technology and a microkernel design geared towards network data access. The WAFL™ file system provides efficient file storage and retrieval based upon efficient access algorithms and data structures. Additionally, network communications using Transmission Control Protocol (TCP) and UDP are also supported at operating system level 100. Of course other types of operating systems can also be used.

As illustrated in FIG. 3, data handling level(layer) 110 includes a packet pacing subsystem (SMPACER) 130 and a streaming disk subsystem (SMDISK) 140. In the present embodiment, streaming disk subsystem 140 is used to retrieve data packets from the file system and to provide the data to SMPACER 130. As will be described below, in one embodiment, SMDISK 140 receives streaming media data packets and in turn SMDISK 140 creates a series of specialized data objects for storing the data. Further, SMDISK 140 receives the specialized data objects from the file system and stores the data packets into a buffer for output as streaming media.

In this embodiment, SMPACER 130 receives data packets (meta-data and payload data) via a pointer to a buffer location or the like from SMDISK 140. In turn, SMPACER 130 sends the pointers to protocol level(layer) 120. As described below, protocol level 120 formats the packets according to the desired streaming protocol. The formatted streaming packets are then received by SMPACER 130. Based upon delivery times for each packet, SMPACER 130 then sends a stream of packets to the client system at the desired rate. In particular, protocol level 120 "filters" or adjusts the "delivery time" of packets to be output to clients, and the like. The adjusted meta-data and the payload data are then output by SMPACER 130 to a client, based upon the adjusted delivery time.

In this embodiment, protocol level 120 includes support for at least one, but typically for more than one streaming media protocols. The support includes encoding of data to form streams of streaming media and decoding of streams of streaming media. In one example, a streaming media protocol is the Microsoft Media Streaming (MMS) protocol. By supporting the MMS protocol, streams of MMS formatted data can be received from a streaming media (upstream or origin) server and the streamed (payload) data can be retrieved. This payload data can be sent to data handling layer 110 via SMDISK 140 for storage. Additionally, payload data determined by SMDISK 140 can be encoded into streams of MMS data. The encoded data are then sent to SMPACER 130 for paced delivery to a client system. The client system may play the encoded data via a player such as Microsoft Windows Media Player, and the like.

In another example, a streaming media protocol is the Real Time Streaming Protocol (RTSP). In addition to RTSP support, one embodiment includes Apple QuickTime format support and RealNetworks RealSystem format support. By supporting these protocols, streams of QuickTime formatted data or RealSystem data can be received from streaming media servers and the respective streaming (payload) data are retrieved. These payloads are then sent to data handling layer 110 via SMDISK 140 for storage. Additionally, payload data from SMDISK 140 can be encoded into streams of data and delivered to the client by SMPACER 130. The streaming data can be played on client systems via a QuickTime player or a RealSystem player, and the like. In other embodiments, other types of streaming media encoding schemes may be supported.

The above hierarchy has been described in embodiments as being implemented via software. However, it should be understood that some functions may be implemented in hardware or firmware. Accordingly, additional embodiments of the above may be implemented via hardware, firmware, software, and combinations thereof. Further description of SMPACER 130 will be given below.

FIGS. 4A–D illustrate a data format hierarchy according to an embodiment of the present invention. In particular, FIGS. 4A–D illustrate an internal storage structure/format used by embodiments for storing data that will be streamed to client systems.

An example of a streaming media cache implementing a data storage structure described below is a NetCache™ streaming media cache. NetCache™ (latest version 5.2) includes a combination of hardware and software available from the assignee of the present patent application. Embodiments of the present invention may stream data to client systems in a variety of streaming media protocols, including Microsoft Media Streaming (MMS) protocol used by Windows Media Player™; Real Time Streaming Protocol (RTSP) used by Quicktime™ from Apple Corporation and RealSystem™ from RealNetworks; and the like.

Figure 4A:
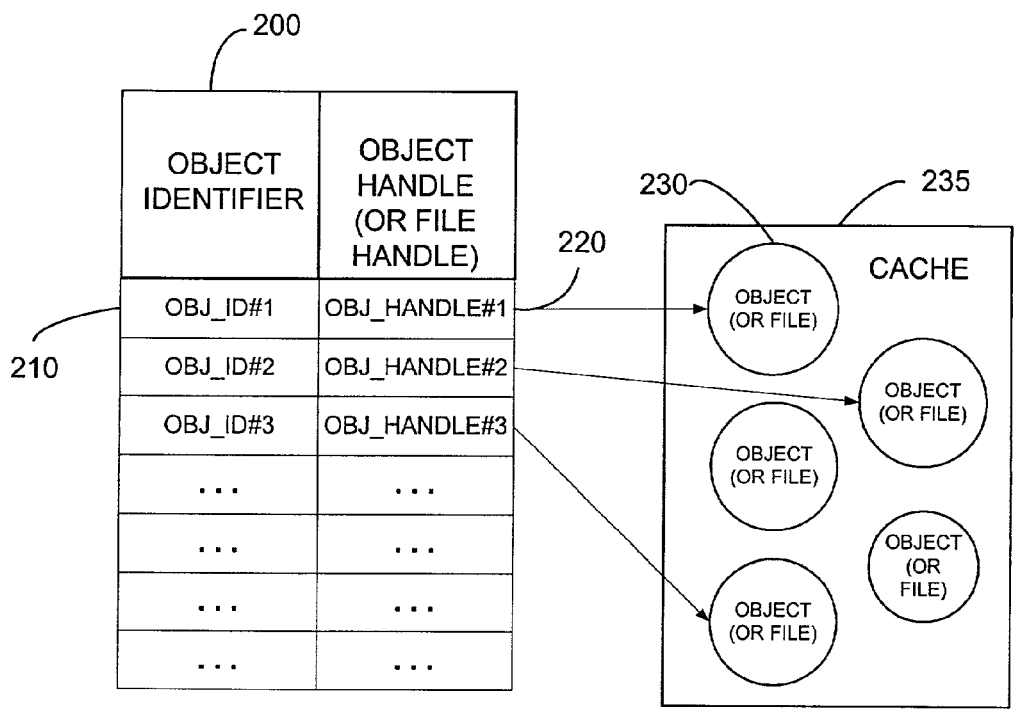
FIGS. 4A–D illustrate a data format hierarchy according to an embodiment of the present invention.

As illustrated in FIG. 4A, the present embodiment includes a cache entry table hash table 200 and a plurality of entries wherein each entry includes an object identifier 210. In one embodiment, object identifiers are file names that have been hashed. Further details regarding this aspect of the invention are disclosed in the co-pending application cited above. Cache entry table 200 typically also includes a plurality of object handles 220 for a particular object. In the present embodiment, object handles 220 may be a reference or pointer to an object 230 corresponding to the object identifier and stored in a cache 235.

In the present embodiment, object handles 220 may be used to retrieve the corresponding object 230 from cache 235. According to an embodiment of the present invention, objects 230 are stored as separate data files in cache 235. In this embodiment, each object handle 220 corresponds to a file handle and the object itself is stored as a file. Accordingly, the individual files are each independently accessible in cache 235 by a file system.

Figure 4B:
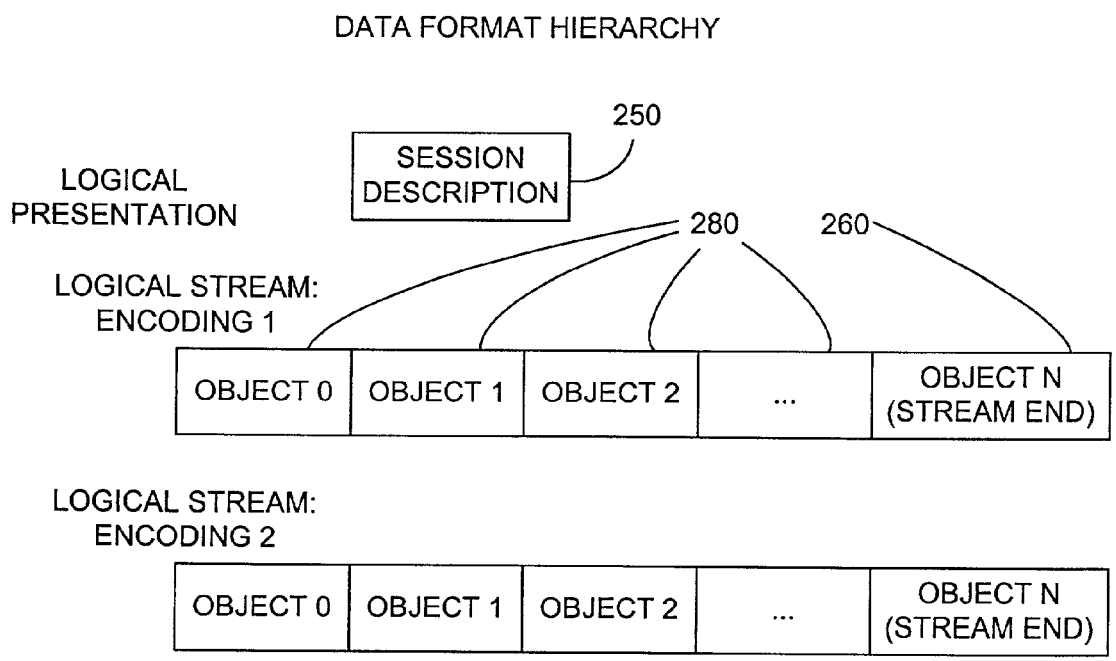

FIG. 4B illustrates a session description 250 (stored in a session data file or session data object) and logical streams of data 260 and 270 according to an embodiment. Logical stream 260 represents data for streaming media encoded in a first encoding scheme and logical stream 270 represents data for streaming media encoded in a second encoding scheme.

In the present embodiment, each of the encodings of the data are considered separate streams of data and are stored separately. This is in contrast to cases where multiple encodings of a data stream are packaged and stored within a single data file. An example of the latter is used by RealNetworks. In particular, a data file used by RealSystem may include an encoding of data destined for 56 Kbps clients, and an encoding of data destined for 384 Kbps clients. In the present embodiment, the encoding of data destined for different bit rate clients would be stored separately. For example, a 56 Kbps encoding would be stored in logical stream 260 and a 384 Kbps encoding would be stored in logical stream 270. Other typical types of parameters that may be varied for different encodings may include the bit rate, the content (e.g. abridged, unabridged), the media type (audio and/or video), thinning parameters (frame dropping), and the like.

In FIG. 4B, session description (stored in a session data object or session data file) 250 may include a description of the various streams of data stored in logical streams 260 and 270. The description may include an enumeration of the various encoding schemes (e.g. 56 Kbps, 128 Kbps, ISDN), copyright and authoring data, presentation or play-time (duration) of the stream, version data, and the like.

As an example, a sample session description for RTSP is as follows. In particular, it illustrates extrinsic properties of the media file (author, title, copyright), as well as intrinsic properties of the media file (number of media tracks, length of media file, encoding bitrate, MIME type, and codec of each media track, etc.). All of this data together serves to help uniquely identify a particular version of the URL used to access the streaming media file.

v=0
o=−983139433 983139433 IN IP4 172.30.200.154
s=G2 Video Experience

```
    i=RealNetworks © 1998
    t=0 0
    a=SdpplinVersion: 1610642970
    a=Flags:integer;2
    a=IsRealDataType:integer;1
    a=StreamCount:integer;2
    a=Title:buffer;
"RzIgVmlkZW8gRXhwZXJpZW5jZQA="
    a=Copyright:buffer;"qTE5OTgA"
    a=Author:buffer;"UmVhbE51dHdvcmtzAA=="
    . . .
    a=range:npt=0–0
    m=audio 0 RTP/AVP 101
    b=AS:6
    a=control:streamid=0
    a=range:npt—0–59.773000
    a=length:npt=59.773000
    a=rtpmap:101 x-pn-realaudio
    a=mimetype:string;"audio/x-pn-realaudio"
    a=MinimumSwitchOverlap:integer;200
    a=StartTime:integer;0
    a=AvgBitRate:integer;6000
    a=EndOneRuleEndAll:integer;1
    a=AvgPacketSize:integer;288
    a=SeekGreaterOnSwitch:integer;0
    a=Preroll:integer;4608
    a=MaxPacketSize:integer;288
    a=MaxBitRate:integer;6000
    a=RMFF 1.0 Flags:buffer;"AAQAAgAAAAIAAA=="
    . . .
    a=StreamName:string;"audio/x-pn-multirate-realaudio
logical stream"
    m=video 0 RTP/AVP 101
    b=AS:50
    a=control:streamid=1
    a=range:npt=0–57.333000
    a=length:npt=57.333000
    a=rtpmap:101 x-pn-realvideo
    a=mimetype:string;"video/x-pn-realvideo"
    a=MinimumSwitchOverlap:integer;0
    a=StartTime:integer;0
    a=AvgBitRate:integer;50000
    a=EndOneRuleEndAll:integer;1
    a=AvgPacketSize:integer;538
    a=SeekGreaterOnSwitch:integer;1
    a=Preroll:integer;5707
    a=MaxPacketSize:integer;607
    a=MaxBitRate:integer;50000
    a=RMFF 1.0

Flags:buffer; "AAoAAgAAAAAAgACAAAAAgAAAA-
IAAA=="
    . . .
    a=StreamName:string;"video/x-pn-multirate-realvideo
logical stream"
    . . .
```

In the present embodiment, logical streams of data, such as logical stream 260 is made up of a series of data objects 280. As described in FIG. 4A, data objects 280 are physically separate files that are directly accessible, independent of other data objects 280, through use of cache entry hash table 200. In this embodiment, data objects 280 together store the "media payload" provided by streaming media encoded in a given encoding scheme. For example, the media payload may include the actual media data included in streaming media packets for a 56 Kbps stream, or the like. More particularly, data objects 280 store the media payload that has been converted from the format in which the origin server stores the media data into the network format for transmission to the client system and the cache. Accordingly, the data objects include data that are optimized for delivery to the client system (e.g., encapsulated in network protocol).

In the present embodiment, each data object 280 is used to store data having an associated and/or a predetermined amount of play time (duration). That is, each data object 280 is used to store media payload data that will be output as streaming data that will be played on a client system for a specific amount of time or duration. For example, in one embodiment, each data object 280 is used to store data that will be streamed to a client as 20 seconds of a music stream, video stream, or the like. In other embodiments, each data object 280 may store a media payload (data) having different duration, such as less than or equal to approximately 5 seconds, 10 seconds, 20 seconds, 30 seconds, 1 minute, or the like.

In one embodiment of the present invention, the duration of output for the media payload stored in typical data objects may be fixed for each data object among logical streams 260 and 270 (e.g. 15 seconds of a stream). However, in other embodiments, the duration of output for the media payload stored in typical data objects in logical stream 260 and data objects in logical 270 may be different. For example, for logical stream 260, the duration may be 15 seconds per data object, and for logical stream 270, the duration may be 30 seconds per data object, and the like.

In another embodiment, each data object 280 may store specific amounts of data instead of a specific duration for data. For example, each data object 280 may store a predetermined number of bytes of data, for example, less than or equal to approximately 64 Kbytes, 128 Kbytes, 512 Kbytes, 1 Mbyte, or the like. In another embodiment, each data object 280 may simply store "chapters" or logical segments of a movie or video, and the like. In one embodiment, each data object 280 stores a fixed number of data chunks, as described below.

In one embodiment of the present invention, data objects 280 store non-overlapping data, or unique portions of the media data. That is, each of the data objects 280 may be configured to store a portion of the media data that is unique to a reference (e.g., URL) in the request to locations in the origin (or upstream) server at which the media file is stored. In another embodiment, data objects 280 may store media data that overlaps or is redundant.

Figure 4C:
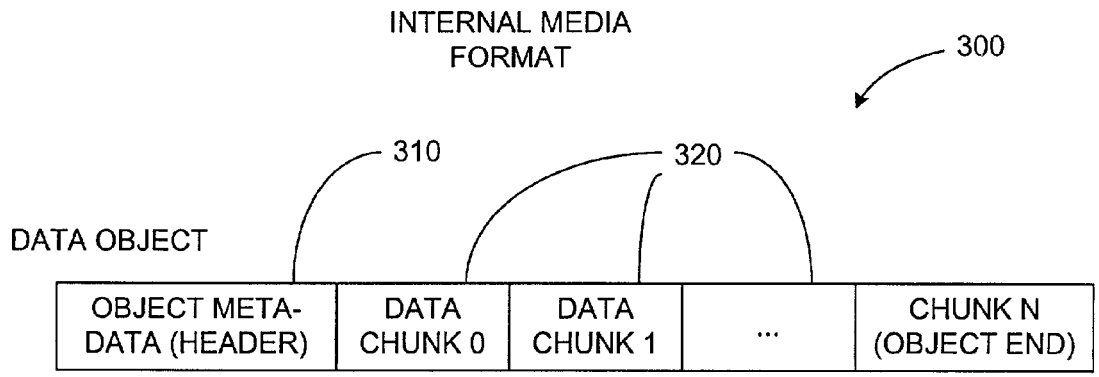

FIG. 4C illustrates a detailed description of a data object according to an embodiment of the present invention. As illustrated, FIG. 4C, a data object 300 includes object meta-data portion 310, and data chunks 320.

In this embodiment, object meta-data portion 310 is used to store data about data object 300. Such meta-data, or header data, may include file format version numbers, the number of data chunks 320 stored, the beginning presentation time and ending presentation time for data objects, and the like. In other embodiments, additional data may be stored in object meta-data portion 310 such as the data object number, protocol-specific per-data object data, a total number of bytes of payload and meta-data per data object, the number of data packets per data object, any end of stream indicators, checksum bits and the like.

In one embodiment, each data chunk 320 is also used to store data of a predetermined amount of presentation or play time (duration). That is, each data chunk 320 is used to store streaming data that will be played on a client system for a specific amount of time. For example, in one embodiment, each data chunk 320 is used to store 20 seconds of a music stream. In other embodiments, each data chunk 320 may store data having different duration, such as less than or equal to approximately 5 seconds, 10 seconds, 20 seconds, 30 seconds, 1 minute, or the like. In one embodiment of the present invention, the duration may be fixed for each data chunk 320 within data object 300. However, in other embodiments, data objects may have different durations.

In another embodiment, each data chunk 320 may store specific amounts of data. For example, each data chunk 320 may store a predetermined number of bytes of data, for example, less than or equal to approximately 32 Kbytes, 64 Kbytes, 128 Kbytes, 512 Kbytes, 1 Mbyte, or the like. In one embodiment, each data chunk has a fixed number of data packets. In still other embodiments, data chunks 320 may have a varying number of data packets.

As will be described below, in the present embodiment, each data chunk 320 is used to store the actual streaming media data. More particularly, each data chunk 320 is used to store packets of data that will be streamed to a client system.

Figure 4D:
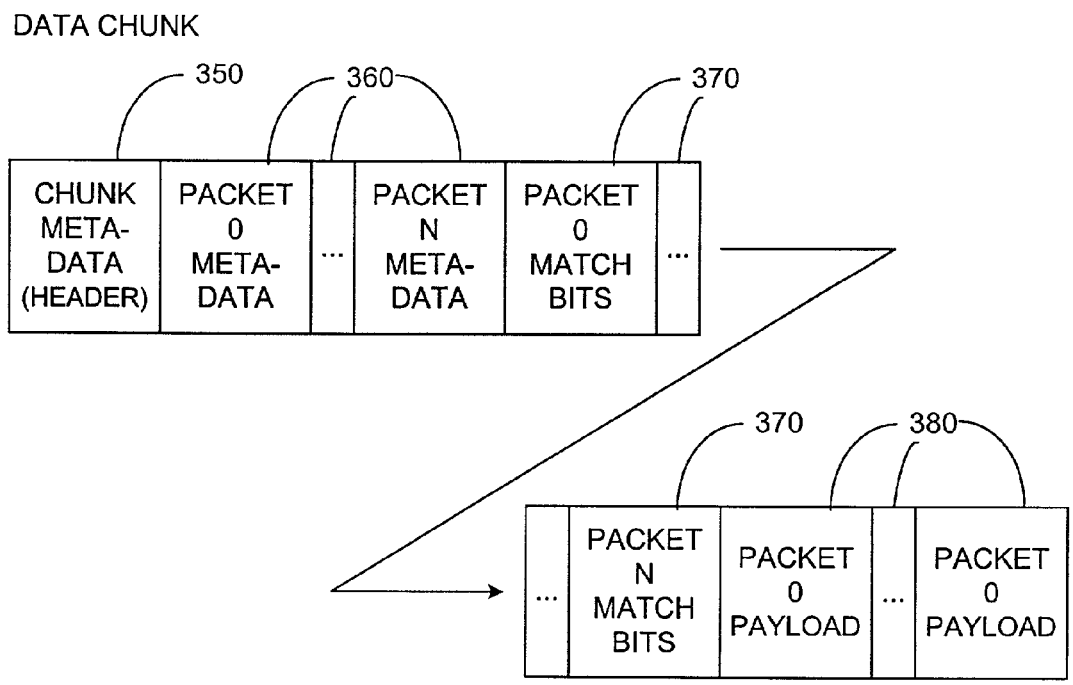

FIG. 4D illustrates a detailed description of a data chunk according to an embodiment of the present invention. Each data chunk 340 includes a chunk meta-data portion 350, packet meta-data 360, packet match bits 370, and packet payloads 380.

In this embodiment, chunk meta-data portion 350 is used to store data about data chunk 340. For example, chunk meta-data portion 350 may specify the number of packet payloads (packets) 380, a file offset for a previous data chunk within the same data object, a file offset for the next data chunk within the same data object, the number of data packets in a data chunk, compressed packet meta-data for the packets, described below, and the like. In additional embodiments, the data chunk meta-data header may also include packet meta-data for all the data packets including the duration (playback duration) of the payload, the presentation time of the payload (e.g. time within a movie), the delivery time of the payload (a time SMPACER 130 delivers the payload data to the client), protocol-specific data of the payload, and the like. Other types of data may be stored in chunk meta-data portion 350 in other embodiments, such as timing information, and the like.

Payload packets 380 are used to store streaming data packets that make up the streaming media. For example, payload packets 380 may store audio data, image data, audiovisual data, and the like. As will be described below, the streaming data packets may be received as stream of data from a streaming media server, or may be derived from a data file received from the streaming media server. For Windows Media Player streaming media, payload packets 380 range from 200 bytes to 18 Kbytes of data, and for RealSystem streaming media and QuickTime streaming media, packet payloads 380 range from approximately 200 to 1.5 Kbytes, typically 600 bytes. The number of packet payloads in data chunk 340 typically depends upon the size of packet payloads 380.

In this embodiment, packet meta-data 360 is used to store information relevant to or associated with each payload packet 380. Types of information may include the delivery time and the presentation time, file offset of the respective payload packet 380, and the like. In the present example, the delivery time is the time SMPACER 130 should send the packet payload to the client. In contrast, the packet presentation time is the time within the media stream that the payload is displayed by the client system.

Packet match bits 370 are used in the present embodiment to store information specific to the streaming media protocol. For example, packet match bits 370 may store data such as flags to identify the start of video key-frames, such as I, B, and or P key frames, or the like. In this embodiment, packet match bits 370 are used to determine the first sendable payload (keyframe) that satisfies a seek request by the client system. In one embodiment, the match bits may be embodied as single bit, however, in other embodiments of the present invention, additional match bits may be used to represent any number of criteria, for example, for selecting which packet will be delivered first, and the like. For Windows Media Player streaming media, packet match bits 370 may be a small as a single bit, and for RealSystem streaming media and QuickTime streaming media, packet match bits 370 are approximately 32 bits.

In this embodiment, the match bits are logically grouped together and separated from the remaining packet metadata. By grouping of the match bits together, the match bits can be compressed into, for example, a single word, thereby saving memory space.

Such key frame data are useful when a client system requests to move around the stream data, for example, when jumping to a particular presentation time T within the stream. In this embodiment, based upon packet match bits 370, the key frame immediately before presentation time T is retrieved and the play-back is begun from that key frame. It has been discovered that in one embodiment, playing-back stream data from the immediately-preceding keyframe reduces the amount of media artifacts or blank time of the stream when played on the client system.

Figure 5:
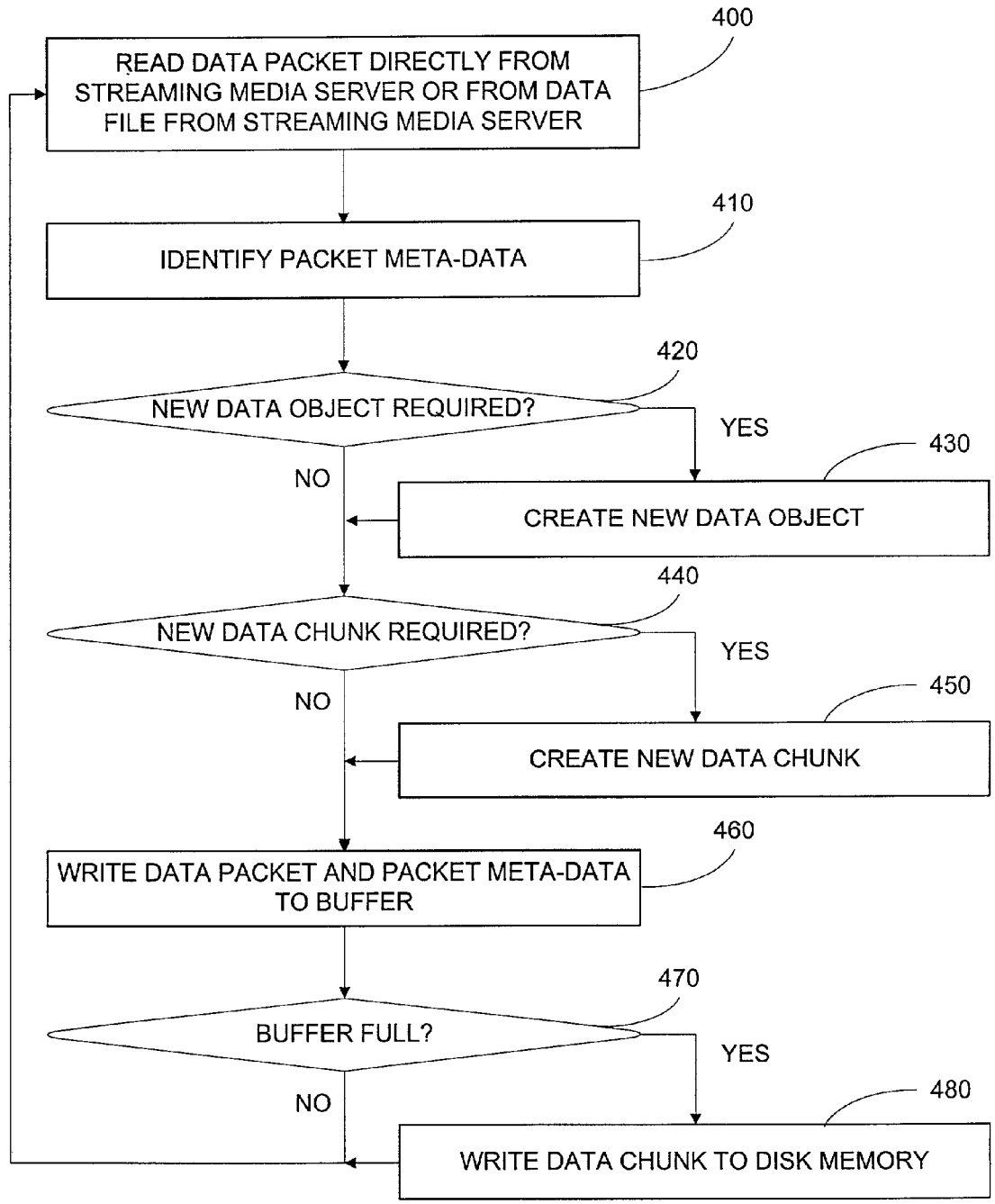
FIG. 5 illustrates a block diagram of a flow chart according to an embodiment of the present invention.

FIG. 5 illustrates a block diagram of a flow chart according to an embodiment of the present invention. More particularly, FIG. 5 illustrates a process of storing streaming media data into embodiments of the present invention. In the below embodiments, data are typically stored using the data format hierarchy illustrated in FIGS. 4A-D.

In FIG. 5, a data packet delivered from a streaming media server is received in step 400. In one embodiment, the streaming media server streams data to the streaming media cache. In such a case, a packet of data from the stream includes header data and a data packet (payload data). In another embodiment, the streaming media server sends a data file including the entire data stream to the streaming media cache. In this case, data packets and the header data are buried within the data file.

In the present embodiment, packet meta-data for a particular packet of data are then identified, step 410. In one embodiment of the present invention, the packet meta-data are derived from the header data of a particular data packet. In another embodiment, the packet is derived from the data file. The packet meta-data may include a presentation time for a data packet, an indication of a video key-frame, and the like. In this example, presentation time is the time within a media stream where the data packet is presented, for example, a data packet may have a presentation time of 20.5 seconds to 20.6 seconds representing when the data packet is output on the client system.

Next, a determination is made as to whether a new data object should be created, step 420. A new data object is typically created when a first data packet is received, or as described below a previous data object is full. In one embodiment, a new data object is created, step 430.

Next, a determination is made as to whether a new data chunk within the data object should be created, step 440. A new data chunk is typically created when a first data packet is received, or as described below, a data chunk is closed after including the previous data packet. In one case a new data chunk is created, step 450.

The data packet and the packet meta-data are then typically written to a buffer location in the streaming media cache random access memory, step 460. This buffer may be RAM 90 or buffer 97. In this embodiment, it is then determined whether the data packet is the last one for a given data chunk, step 470. If not, the process above is repeated for the next data packet.

When the data chunk is full, the chunk meta-data are determined, and the data chunk is written to random access memory (or to disk memory), step 480. In this embodiment, it is then determined whether the data chunk is the last one for a given data object, step 490. If not, the process above is repeated for the next data packet.

In this embodiment, when the data object is full, the object meta-data described above is determined, and the data object is written to disk memory, step 400. The process above may then be repeated until there are no more data packets in the media stream.

Accordingly, using the above steps, streaming media data may be received by a streaming media cache and stored in a disk memory in the object-based scheme described above. Additionally, streaming media data may be received in the form of a data file. This data file is parsed and the data are also stored in a disk memory in the object-based scheme described above.

In the above embodiment, most of the functions are performed by SMDISK 140, discussed in FIG. 3. In particular, steps 400 and 470 are typically performed at least in part by SMDISK 140; and step 480 is typically performed by a file system within operating system level 100.

Figure 6:
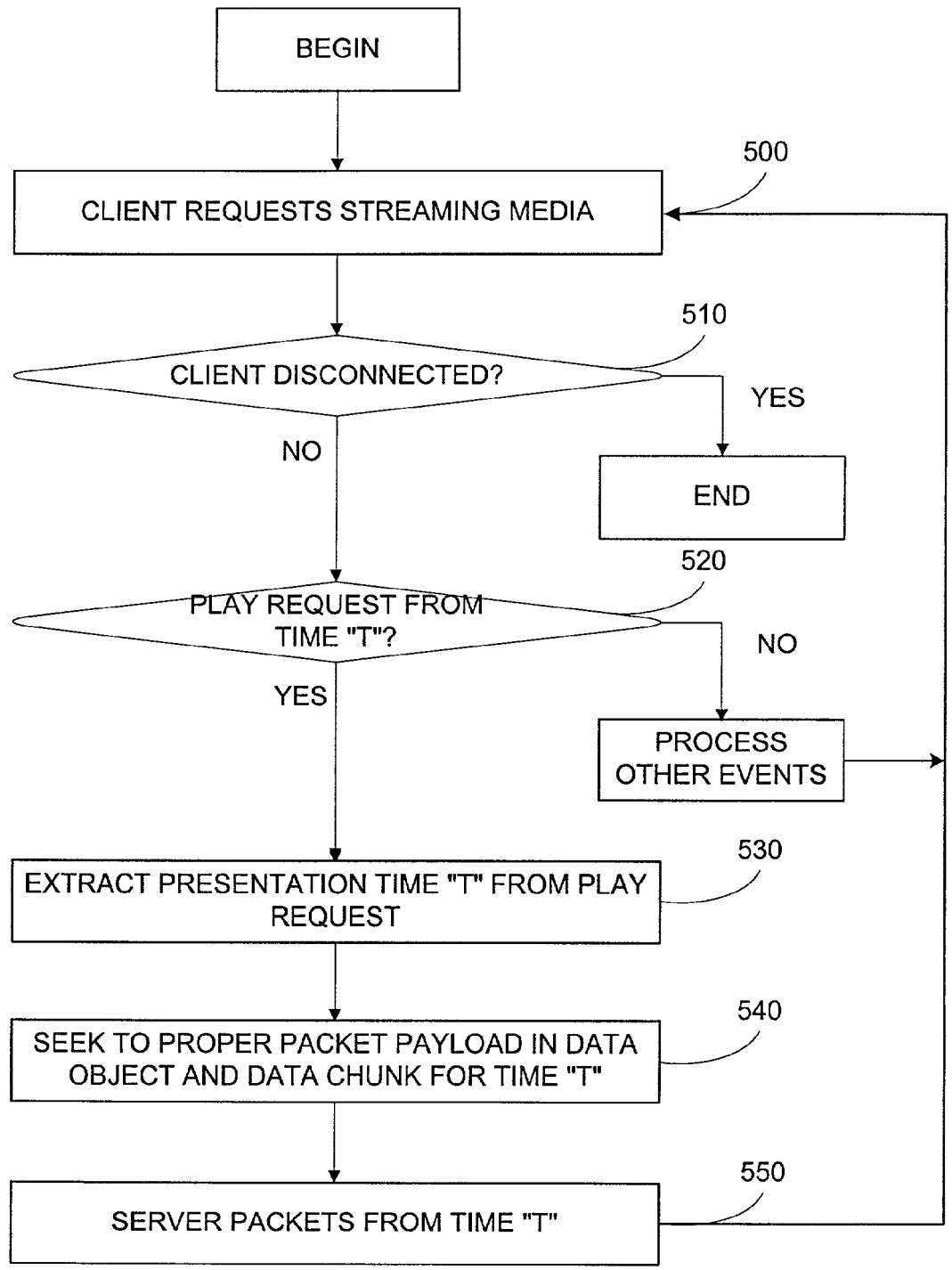
FIG. 6 illustrates a block diagram of a flowchart according to an embodiment of the present invention.

FIG. 6 illustrates a block diagram of a flowchart according to an embodiment of the present invention. In particular, FIG. 6 illustrates an overview of the process of retrieving data stored in a disk memory of the streaming media cache as described in FIGS. 4A-D and forming a stream of streaming media data to a client system.

In this example, a client system requests streaming media from an embodiment of a streaming media cache, step 500. In one case, a request for streaming media may be made directly from a client system or via a proxy. Such a request is typically in the form of a URL, or the like. Additionally, the request may specify a presentation time T that represents the time where the playback should begin. Most requests set T equal to zero, however T is typically non-zero when the client system jumps around the media stream (e.g. makes a "seek" request).

If the client system does not terminate its connection with the streaming media cache, step 510, a determination is made as to whether to playback the streaming data or not, step 520. In embodiments of the present invention, other types of client events may be specified, such as disconnecting, a play request, a pause request, a stop request, a seek request, notification to the cache that while the client is receiving streaming data from the cache, that a future object is missing and needs to be prefetched, and the like.

In the present embodiment, if streaming data are to be streamed to the client system, the presentation time T is determined, step 530. Next, based upon the time T, the payload packet that includes data having the presentation time T is located, step 540. This step is typically performed in part by SMDISK 140. Next, the data are then formatted for the specific protocol and then sent to the client system, step 550. This step is typically performed in part by SMPACER 130 and protocol level 120. More detailed descriptions of the above steps is given below.

Figure 7:
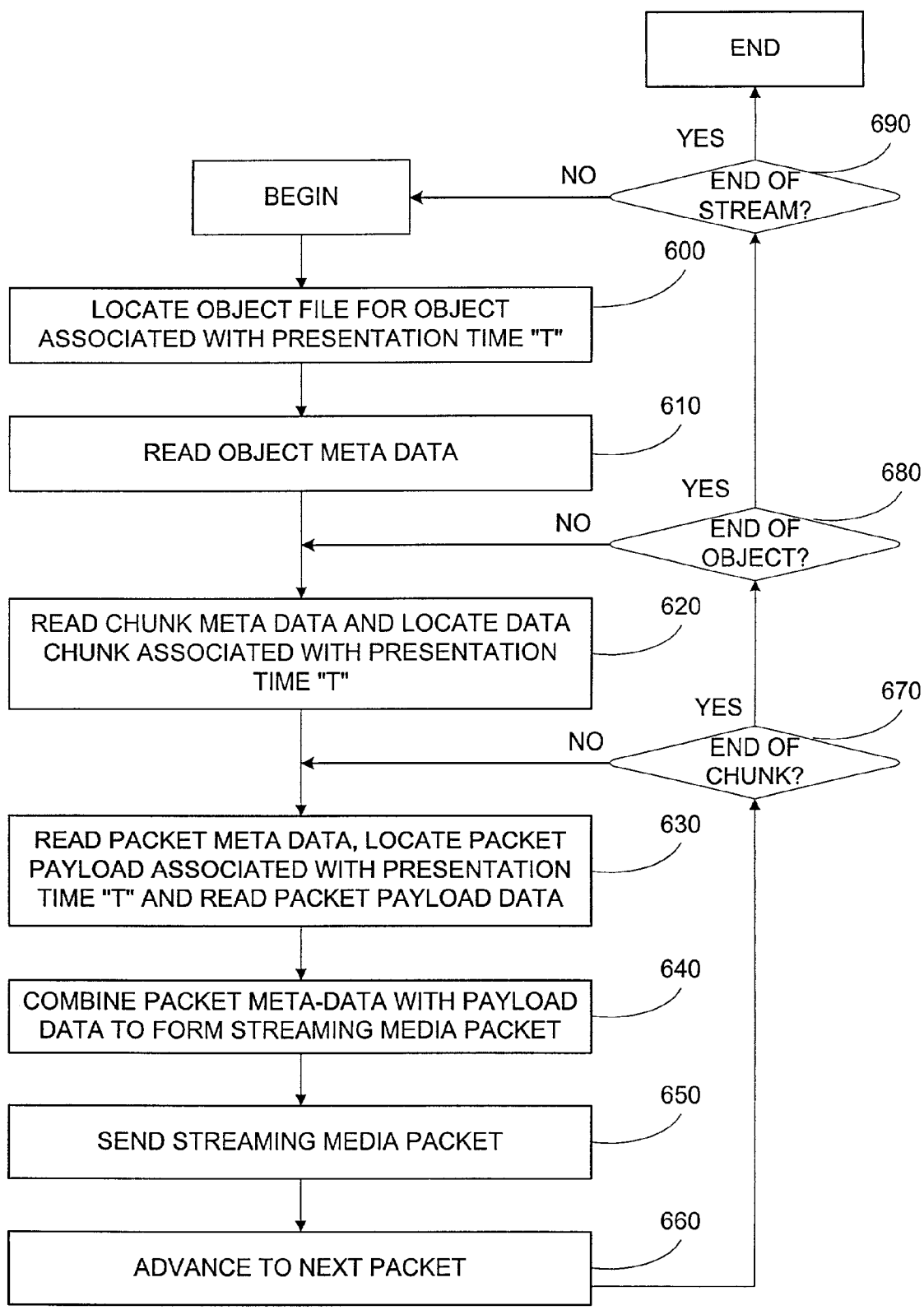
FIG. 7 illustrates a block diagram of a flowchart according to an embodiment of the present invention.

FIG. 7 illustrates a block diagram of a flowchart according to an embodiment of the present invention. In particular, FIG. 7 illustrates a more detailed process of locating and serving data.

In the present embodiment, in response to the presentation time T, the streaming media cache initially determines which data object to retrieve first, step 600. In the embodiment above, because an amount of time for each data object is fixed, for example at 10 seconds, the appropriate data object can easily be determined. For example, if the presentation time T were 5 minutes into a data stream, the appropriate data object would be the thirtieth one ((5 minutes×60 seconds/minute)/10 seconds/data object=30). In one embodiment, the URL of the file, along with the presentation time T is first hashed, and the hash is then used to access the cache entry hash table illustrated in FIG. 4A. In another embodiment, a URL of the file, the type of encoding of the file, a validator for the file, and the time T is hashed, and the hash is used to access the cache entry hash table illustrated in FIG. 4A. In return, the cache entry hash table provides the appropriate file handle of the targeted data object.

Based upon the file handle, the object meta-data are first retrieved, step 610. The data are typically stored within RAM 90. Based upon the number of chunks of data within the target data object, the target data chunk is determined. In the present embodiment, the meta-data of the first data chunk in a data object is first retrieved and stored within RAM 90. This data also includes the packet meta-data for that data chunk. Then, using the chunk meta-data, by using the file offset meta-data, the target data chunk containing the desired packet payload (keyed by presentation time) is determined.

Next, the chunk meta-data of the target data chunk is retrieved, step 620. The chunk meta-data are stored within RAM 90 for access by processor 50. As described above, the chunk meta-data may specify the number of payload packets stored within the chunk. Next, based upon the number of payload packets within the data chunk, the target payload packet is determined. The packet meta-data of the target payload packet is then retrieved and stored within RAM 90 for access by processor 50, step 630.

In the present embodiment, packet match bits 270 are also retrieved, and if compressed, uncompressed. The packet match bits 270 are typically stored within RAM 90.

In the present embodiment, portions of the packet meta-data and the target payload packet are then combined, step 640. The resulting packet is sent to the client system, step 650. In embodiments of the present invention, the target payload packet is the same as what was received from the origin server. Further, the packet meta-data are typically protocol-specific header data, i.e. the data depends upon the type of stream provided, such as Quicktime, Windows Media, and the like. for example, the meta-data may include a per-client sequence number, packet timing information, and the like.

After this target payload packet is sent, this embodiment attempts to iterate to the next payload packet, step 660. If the target payload packet is the last one of the target data chunk, step 670, this embodiment attempts to iterate to the next data chunk. If the target data chunk is the last one of the target data object, step 680, this embodiment attempts to iterate to the next data object. If the target data object is the last one of the stream, step 690, the stream terminates.

In the above embodiment steps 600–630 are performed at least in part by SMDISK 140; step 640 is performed at least in part by SMPACER 130; and step 650 is performed at least in part by SMPACER 130. More specifically, SMDISK 140 typically retrieves packet meta-data and packet payloads from the cache memory (hard disk) and stores them into a memory buffer, such as buffer 97. SMDISK 140 then gives pointers to these buffer locations to SMPACER 130, and in turn SMPACER 130 gives the pointers to these buffer locations to protocol level 120. An encoding protocol in protocol level 120 processes the meta-data portion, and importantly, then simply appends the packet payload to form an encoded packet. This encoded packet is sent to SMPACER 130 for paced delivery to a client.

As illustrated above, packet payloads are simply stored and retrieved from the cache memory (hard disk) and no processing occurs on such data. The payload data are merely segmented into convenient-sized data chunks and data objects by SMDISK 140 and then stored in the cache memory. As discussed above, these data objects are individually accessible on a file level.

Figure 8:
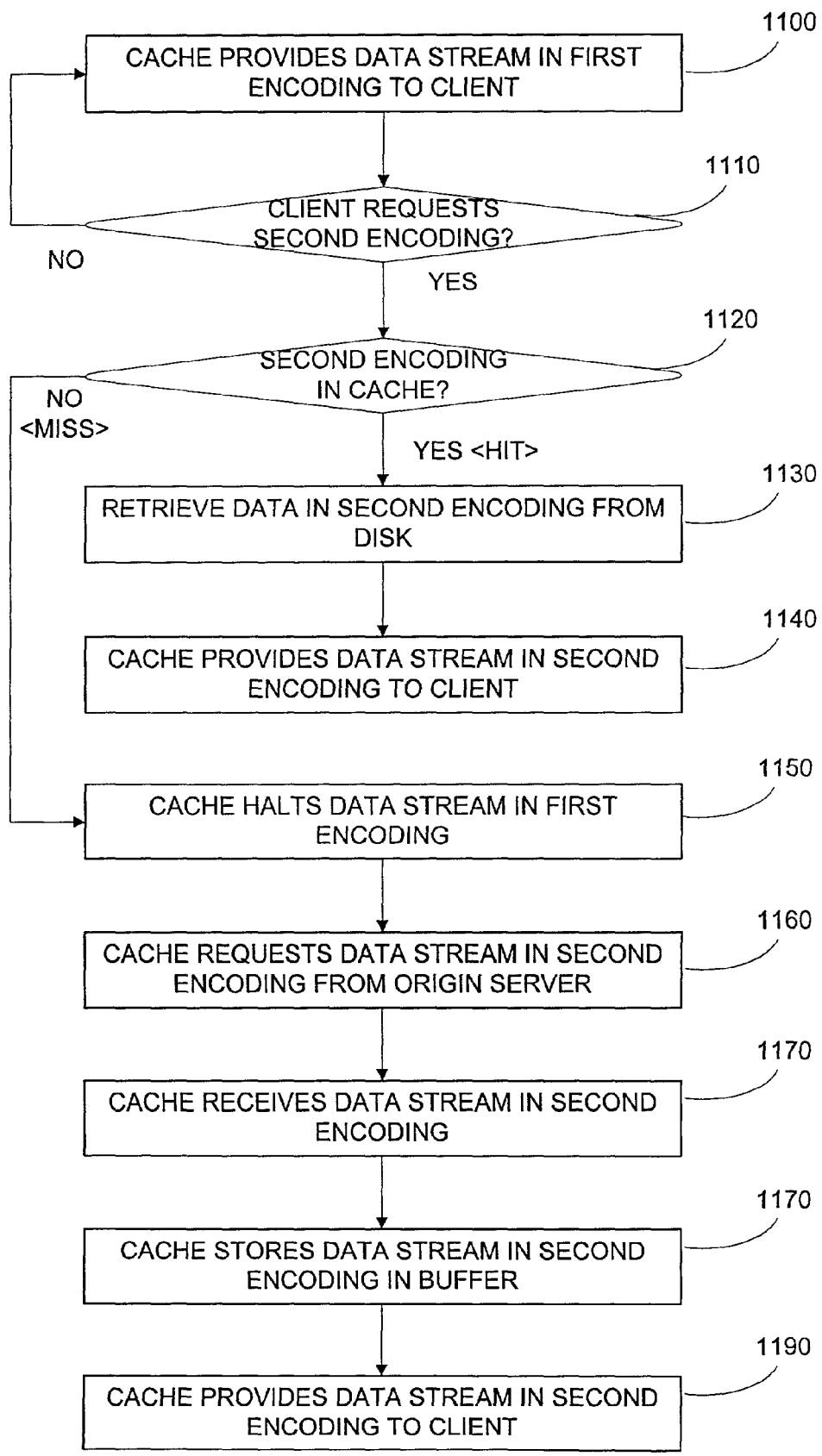
FIG. 8 illustrates illustrate the operation of streaming media cache in response to a change in client system stream request according to an embodiment.
Figure 9A:
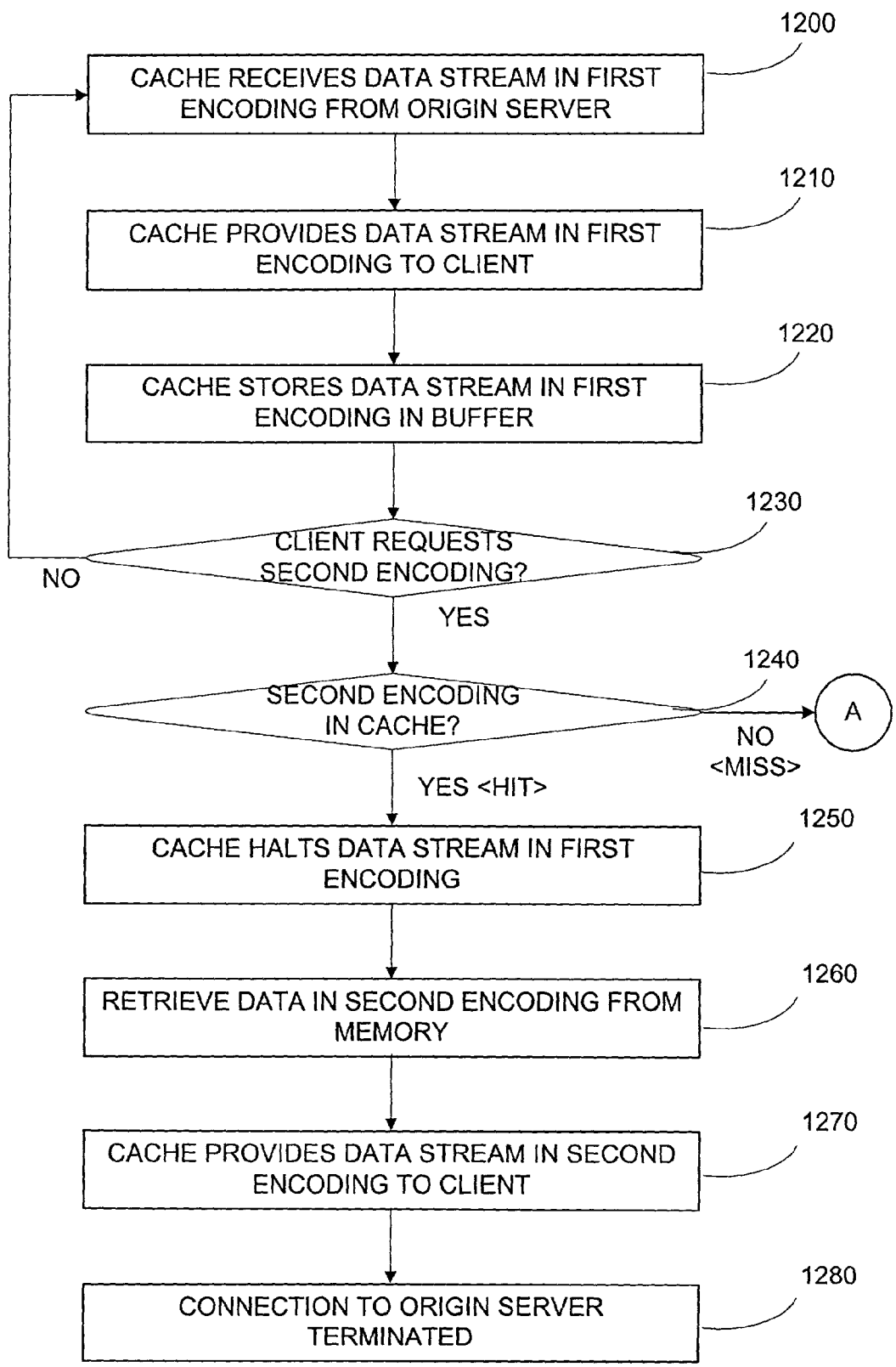
FIGS. 9A–B illustrate the operation of streaming media cache in response to a change in client system stream request according to an embodiment.
Figure 9B:
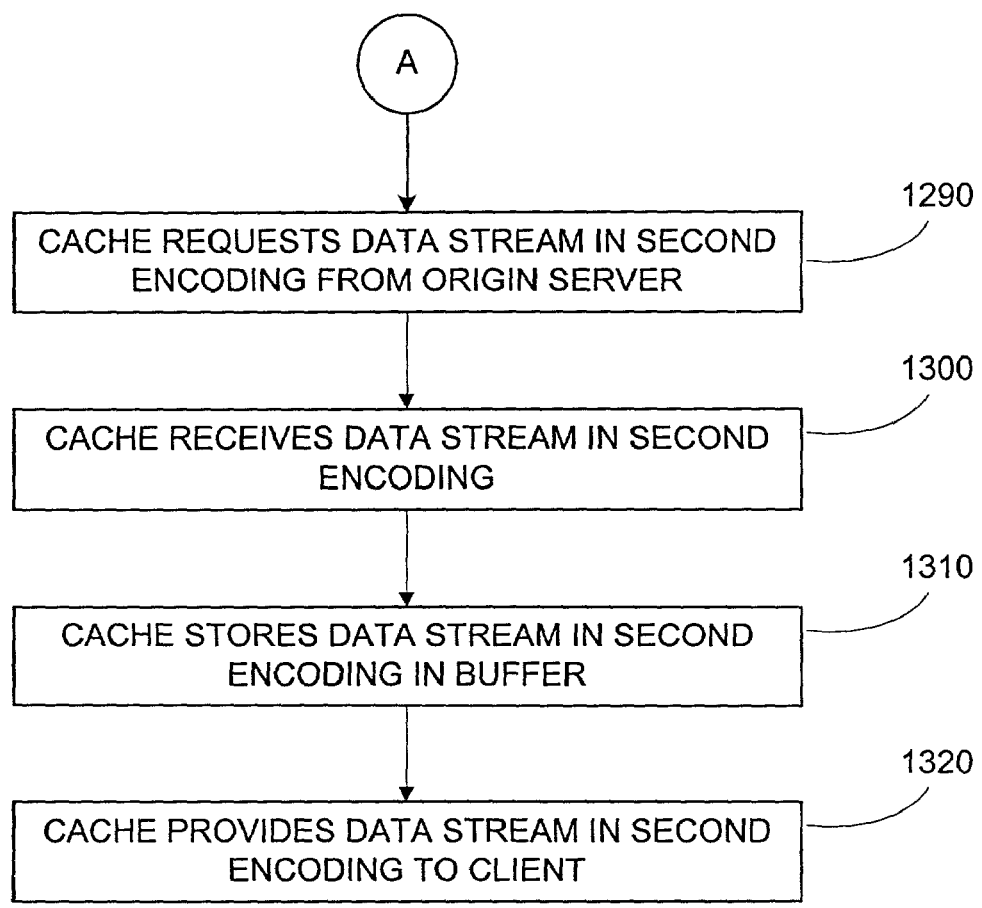
Figure 10A:
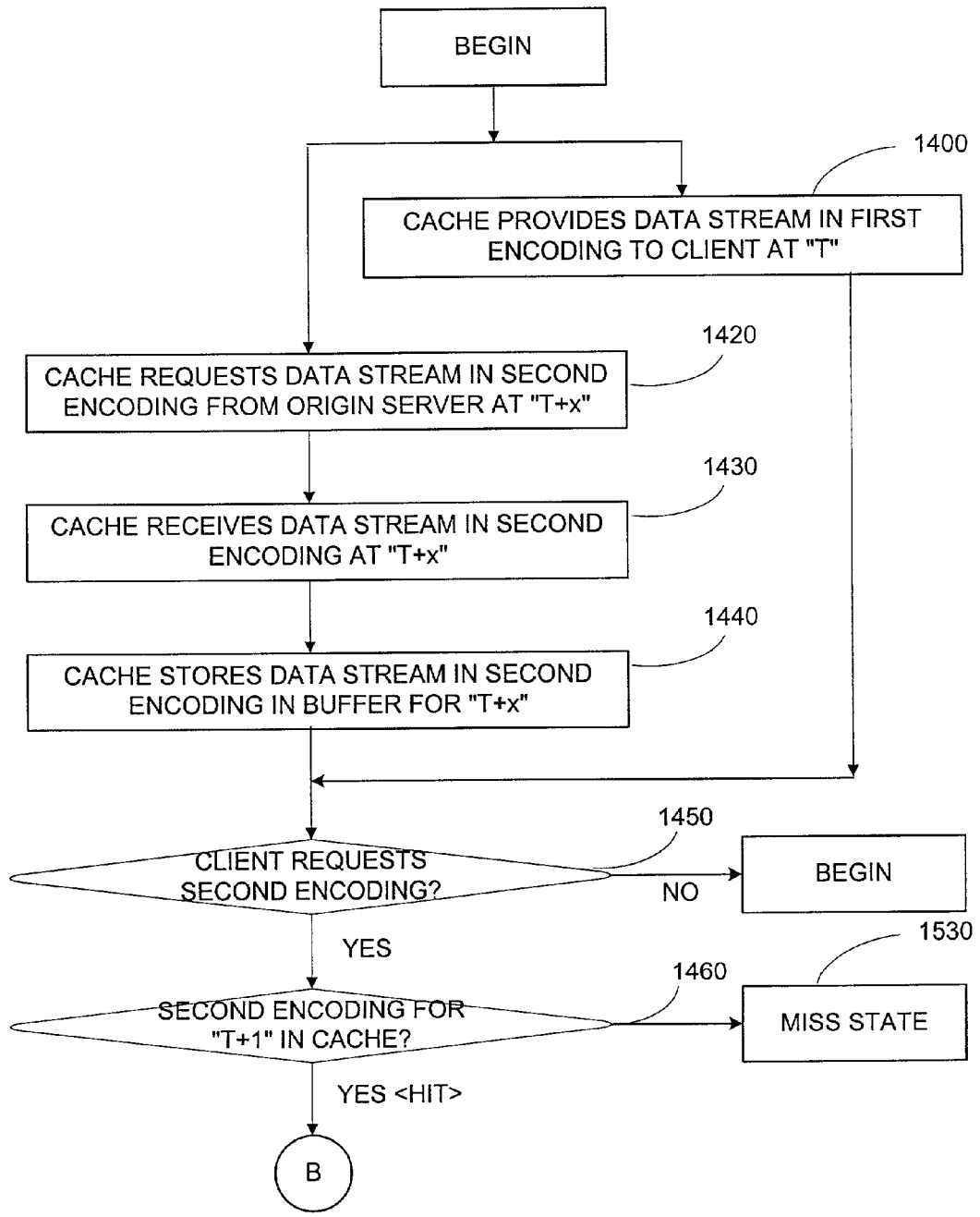
FIGS. 10A–B illustrate the operation of streaming media cache in response to a change in client system stream request according to an embodiment.
Figure 10B:
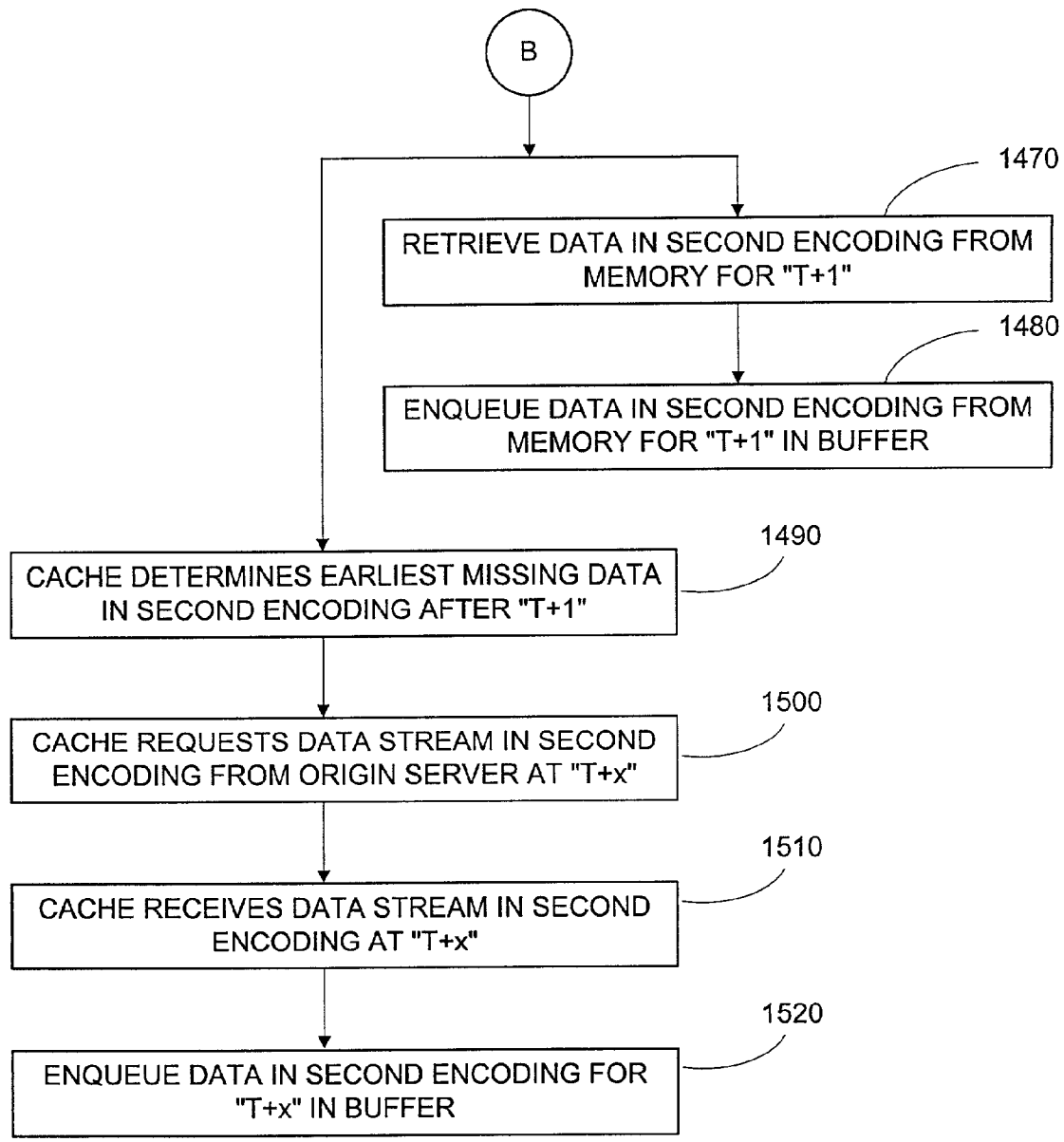

FIGS. 8, 9A–B, and 10A–B illustrate block diagrams of flow charts according to embodiments of the present invention. In particular, FIG. 8 illustrates transitions for streaming media cache 27 from a hit state to a hit state, and a hit state to a miss state; FIGS. 9A-B illustrate transitions for streaming media cache 27 from a miss state to a hit state, and a miss state to a miss state; and FIGS. 10A-B illustrate transitions for streaming media cache 27 from a "disk miss" state to a hit state, and a "disk miss" state to a "disk miss" state.

FIG. 8 illustrates the operation of streaming media cache 27 in response to a change in client system 17 stream request. FIG. 8 specifically illustrates operations of streaming media cache 27 when moving from a "pure cache hit" (hit) state to another hit state or to a "pure cache miss" (miss) state.

Initially, in response to a client request, streaming media cache 27 provides streaming media data of a first encoding scheme to client system 17 at presentation time T, step 1100.

In this embodiment, client system 17 then changes it request, and requests streaming media cache 27 to provide the streaming media data in a second encoding scheme, step 1110. In one embodiment, the changed request may specify that the stream should begin at a presentation time T+α, for example T+1, T+3, etc.

It is envisioned that client system 17 may request that different encoding schemes be sent to it during any stream of media data. This functionality is typically provided to facilitate better use of streaming media cache 27 output bandwidth and other network components. For example, client system 17 may initially request a 384 Kbps encoding of data from streaming media cache 27. However, because of network congestion at the ISP of client system 17, the effective transfer rate is 56 Kbps. Accordingly, client system 17 will change its request and request a 56 Kbps encoding of data from streaming media cache 27. By doing this, in this example, approximately 327 Kbps of streaming media cache 27 output bandwidth is saved. Further, the encoded data is more optimized for the lower bandwidth client system.

Streaming media cache 27 then determines if it has the requested streaming media data in the second encoding format, step 1120. Using the techniques described above, and in the referenced co-pending application, streaming media cache 27 determines whether it stores the appropriate data objects. If so, streaming media cache 27 retrieves the appropriate data object from disk memory, step 1130, and then outputs the requested streaming media data to client system 17, step 1140.

In one embodiment, streaming media cache 27 determines the appropriate data object to retrieve by determining the data object that includes presentation time T+1 data. In other embodiments, if client system 17 specifies a presentation time T+α, streaming media cache 27 uses T+α to determine the appropriate data object from the hard disk memory.

In an embodiment of the present invention, streaming media cache 27 immediately stops sending data to client system 17 when it receives the new request and waits until new data is retrieved from hard disk. When the data is retrieved from disk, streaming media cache 27 begins streaming data having the second encoding scheme to client system 17. In other embodiments of the present invention, the output of media data to client system 17 in the second encoding begins as soon as data is retrieved from disk. In other embodiments, streaming media cache 27 delivers the first encoding until presentation time T+α and thereafter delivers the second encoding of the streaming media data. Many other different ways to transition the data streams may be envisioned in light of the present patent disclosure.

Steps 1100–1140 thus illustrate the hit state to hit state transition. The process may then repeat.

As illustrated in FIG. 8, if the requested streaming media is not stored in the second encoding, streaming media cache 27 may stop sending client system 17 the data in the first encoding immediately, step 1150. In other embodiments, however, streaming media cache 27 will continue sending data in the first encoding until data in the second encoding is received from an origin server.

Next, streaming media cache 27 initiates a connection to origin (or upstream) server 37, and requests the streaming media data in the second encoding, step 1160. In one embodiment, streaming media cache 27 specifies a beginning presentation time or a packet number for the return data. For example, streaming media cache 27 may specify presentation time T+1, T+2, T+3, or the like.

In the current embodiment, streaming media cache 27 waits until it receives the stream of media data in the second encoding, step 1170. Other embodiments may include time out conditions. Once the data in the second encoding is received, it is stored in a buffer in streaming media cache, step 1180, and output to client system 17, step 1190. In another embodiment, step 1180 may be performed before step 1190.

In the present embodiment, the second encoding of the stream of media data is stored to disk using the process described in FIG. 5. In particular, media data packets that are received from an origin server are first put into a buffer, (step 460). Once the buffer is full, (step 470) the data chunk is written to the hard disk memory, (step 480). Further details regarding this process will be described below.

Steps 1100–1120 and 1150–1190 thus illustrate the hit state to miss state transition. At this point, streaming media cache 27 is in a miss state. Transitions from the miss state to a hit state or a miss state is described below.

FIGS. 9A–B illustrate the operation of streaming media cache 27 in response to a change in client system 17 stream request. FIGS. 9A–B specifically illustrate operations of streaming media cache 27 when moving from a "pure cache miss" (miss) state to another miss or to a "pure cache hit" (hit) state.

When in the miss state, streaming media cache 27 receives media data from an origin (or upstream) server in a first encoding, step 1200. Streaming media cache 27 then provides the media data in the first encoding to client system 17 for presentation time T, step 1210, and then stores the media data in a buffer, step 1220.

In this embodiment, client system 17 then changes it request, and requests streaming media cache 27 to provide the streaming media data in a second encoding scheme, step

1230. In one embodiment, the changed request may also specify that the stream should begin for the presentation time T+α, for example T+1, T+3, etc. In other embodiments, the changed request may not specify when the stream should begin, and a default presentation time, such as T+1, is assumed.

In response to the request, streaming media cache 27 determines if it has the requested streaming media data in the second encoding format, step 1240. Again, using the techniques described above, and in the referenced co-pending application, streaming media cache 27 determines whether it stores the appropriate data objects.

In the present embodiment, if streaming media cache 27 already has the media data in the second encoding on disk, it stops sending the first encoding to client system 17, step 1250. Streaming media cache 27 then begins retrieving the media data in the second encoding format from disk memory, step 1260. Once the media data in the second encoding format is retrieved, streaming media cache outputs the requested streaming media data to client system 17, step 1270.

In this embodiment, after streaming media data in the second encoding format is successfully retrieved from disk memory, streaming media cache 27 closes the connection with the origin server, step 1280.

Steps 1200–1280 thus illustrate a miss state to a hit state transition. At this point, streaming media cache 27 is back in the hit state. Transitions from the hit state to a hit state or a miss state are described in FIG. 8, above.

In the embodiment illustrated in FIGS. 9A–B, if the requested streaming media data in the second encoding was not cached, streaming media cache 27 continues to send data in the first encoding, until data in the second encoding is received from an origin server, below. In an alternative embodiment, streaming media cache 27 may immediately stop sending data to client system 17, and resume only when the media data in the second encoding is received.

In the present embodiment, streaming media cache 27 already has a connection to origin (or upstream) server 37 for media data in the first encoding. Thus streaming media cache 27 requests the streaming media data in the second encoding, step 1290. In one embodiment, streaming media cache 27 may again specify a beginning presentation time or a packet number for the second encoding of the media data. For example, streaming media cache 27 may specify a presentation time T+1, T+2, T+3, or the like.

In the current embodiment, streaming media cache 27 then waits until it receives the stream of media data in the second encoding, step 1300. Other embodiments may include time out conditions. Once the data in the second encoding is received, it is stored in a buffer in streaming media cache, step 1310. Streaming media cache 27 then outputs the media data from the buffer to client system 17, step 1320. In another embodiment, steps 1320 may be performed before step 1310.

In the present embodiment, the second encoding of the stream of media data may be stored to disk in the process described in FIG. 5. Further details regarding this process will be described below.

Steps 1200–1240 and 1290–1320 thus illustrate the miss state to miss state transition. At this point, streaming media cache 27 is in a miss state. The process above may then repeat.

FIGS. 10A–B illustrate the operation of streaming media cache 27 in response to a change in client system 17 stream request. FIGS. 10A–B specifically illustrate operations of streaming media cache 27 when moving from a "disk miss" state to a "pure cache hit" (hit) state or to another "disk miss" state.

Initially, in response to a client request, streaming media cache 27 provides streaming media data of a first encoding scheme from a hard disk to client system 17 beginning presentation time T, step 1400.

As illustrated in FIG. 10A, while streaming media cache 27 provides this data to client system 17, streaming media cache 27 pre-fills the hard disk with additional media in the first encoding scheme. In this embodiment, it is contemplated that streaming media cache 27 currently stores media data from presentation time T to T+δ−1. Thus, streaming media cache 27 first requests streaming media data in the first encoding for presentation time T+δ from the origin server, step 1420. Next, streaming media cache 27 waits until it receives the stream of media data in the second encoding at presentation time T+δ, step 1430. In the present embodiment, the data is then stored in a buffer in streaming media cache, step 1440.

In this embodiment, client system 17 then changes it request, and requests streaming media cache 27 to provide the streaming media data in a second encoding scheme, step 1450. In one embodiment, the changed request may specify that the stream should begin for the presentation time T+α, for example T+1, T+3, etc. However, in other embodiments, streaming media cache 27 assumes "as soon as possible," for example, for presentation time T+1.

Streaming media cache 27 determines if it has the requested streaming media data in response to the new client request beginning presentation time T+1, for example, step 1460. Using the techniques described above, and in the referenced co-pending application, streaming media cache 27 determines whether it stores the appropriate data objects. If so, streaming media cache 27 retrieves the appropriate data object from disk memory, step 1470, and then outputs the requested streaming media data to an output buffer for client system 17, step 1480.

In the present embodiment, while the above steps are occurring, streaming media cache 27 determines the presentation time of the earliest missing media packet in the second encoding after presentation time T, step 1490. For example, streaming media cache 27 may determine if media data in the second encoding associated with presentation time T+2, T+3, . . . T+6 is currently stored. In this example, if media data associated with presentation time T+3 and T+4 are missing, the earliest missing media packet in the second encoding is T+3.

Next, streaming media cache 27 requests the streaming media data for the earliest missing presentation time from the origin server, step 1500. Continuing the example above, the presentation time would be T+3.

In the current embodiment, streaming media cache 27 then waits until it receives the requested data, step 1510. Once the data is received, it is stored in a buffer in streaming media cache, step 1520.

The above steps 1400–1460 and 1500–1520 thus illustrate a disk miss condition to a disk miss condition.

In the present embodiment, if streaming media cache 27 does not store the media data in the second encoding, streaming media cache 27 enters a miss state, step 1530. In such a state, steps similar to steps 1290–1310 or 1140–1190 may be performed to obtain the media data in the second encoding.

Figure 11:
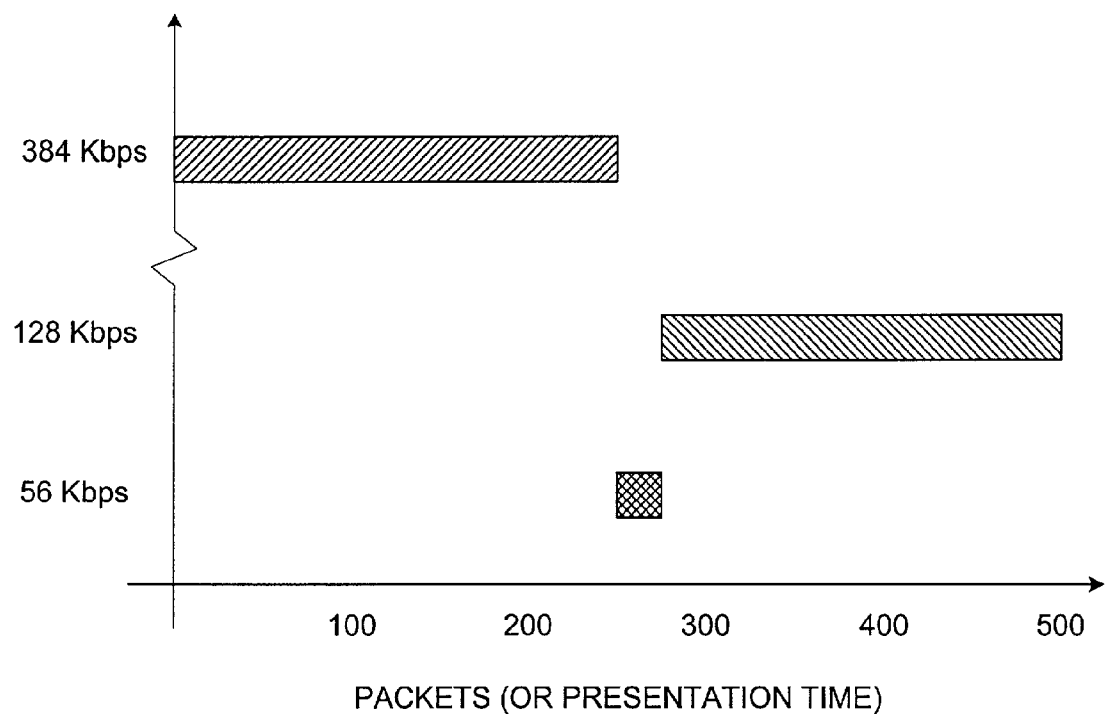
FIG. 11 illustrates an example according to an embodiment of the present invention.
Figure 11:
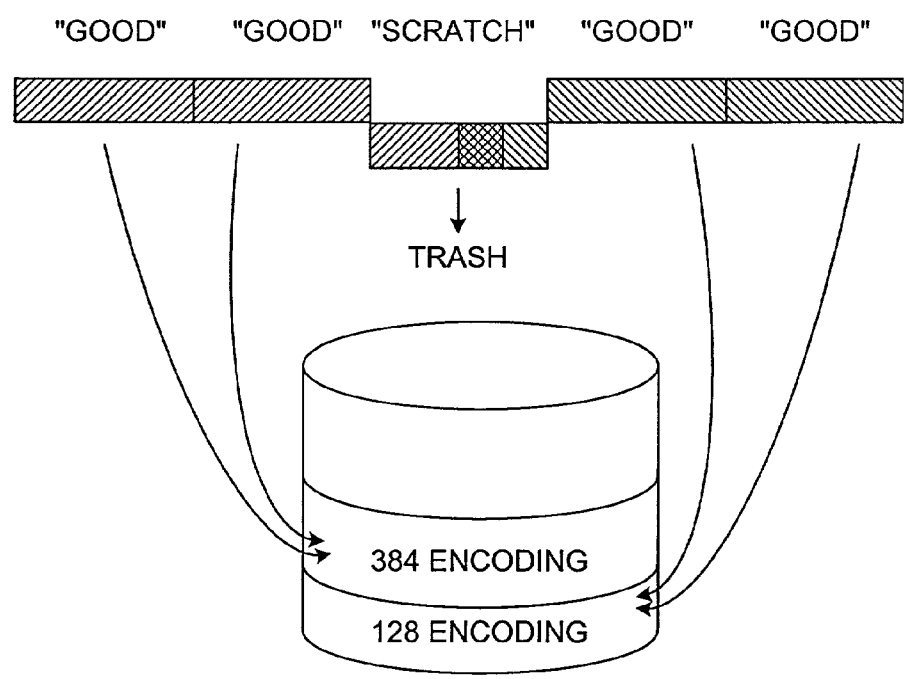

FIG. 11 illustrates an example according to an embodiment of the present invention. In particular, FIG. 11 illustrates an example of "scratch" data chunks.

In embodiments of the present invention, it is contemplated client systems may freely request different encoding schemes. That is, in a worst case, on a packet by packet (or presentation time) basis, a client can switch encodings. In the example illustrated in FIG. 11, for streaming media data packets 0–250, a client may have asked for 384 Kbps encoded data; for data packets 251–270, the client may have asked for 56 Kbps encoded data; and for data packets 271–500, the client may have asked for 128 Kbps encoded data.

As each of these data packets are received, they are buffered, as discussed in step 460 in FIG. 5. Typically, once the buffer is full, a data chunk is written to the disk, step 480. However, it has been discovered by the inventors that it is highly undesirable for a data chunk to store a stream of media data packets having different encodings. Instead, it is believed to be more desirable to have data chunks store data of only a single encoding. To do this, streaming media cache 27 determines, based upon the packet meta data, the encoding scheme of each data packet in the buffer before it is stored. In this embodiment, data chunks are written to disk only if the packets are all of the same encoding.

In FIG. 11, a buffer 1600 is illustrated as storing a hundred packets before it is full. In light of the above, since all data packets in packets 0–199 are encoded at 384 Kbps, they are written to the disk as two separate data chunks; also, since all data packets in packets 300–500 are encoded at 128 Kbps, they are also written to the disk as two separate data chunks; however for packets 200–299, buffer 1600 includes packets from three different encodings. In the last case, streaming media cache 27 tags the data chunk as a "scratch" data chunk.

In one embodiment of the present invention, "scratch" data chunks are not written to disk, but are discarded. In another embodiment, "scratch" data chunks are written to disk, but are marked for deletion.

In view of the above disclosure, many other variations can be envisioned. For example, different methods for transitioning between the above hit state, miss state, and disk miss state are contemplated. For example, in some embodiments, when a streaming media cache receives a request for a second encoding, the streaming media cache continues to provide data in the first encoding until data from the second encoding arrives. In another embodiment, streaming media cache immediately stops sending the first encoding, and waits for the second encoding. In still other embodiments, different types of transitions are used for the different state changes.

As another example, different ways to determine and handle "scratch" data chunks are contemplated. For example, in one embodiment, data chunks that have packets of different encodings are also written to the disk. Further the "scratch" data chunks become "valid" data chunks for each of the encodings stored therein. In such an example, the streaming media cache may determine on a packet by packet basis within a data chunk, which data packets belong to which encoding.

The invention has been described in embodiments above as a file cache or a streaming media cache. It should be understood, however, that, embodiments may be embodied in any computer system as a stand-alone system, or as part of another system. For example, one embodiment may be integrated into a computer system that includes web server software, database software, and the like. As another example, one embodiment may be distributed among a set of computer systems in a network, or the like. In similar examples, when there is a miss, embodiments of the present invention may access other embodiments in the network (upstream servers) before attempting to access an origin server, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for storing data in a streaming media cache including disk memory, the method comprising:

receiving a first plurality of data packets from an upstream server, the data packets comprising payload data and meta data, wherein the meta data for each data packet from the first plurality of data packets indicate a first encoding scheme for the payload data;

receiving a second plurality of data packets from the upstream server, the data packets comprising payload data and meta data, wherein the meta data for each data packet from the second plurality of data packets indicate a second encoding scheme for the payload data;

storing a first set of data packets in a buffer from a series of data packets comprising the first plurality of data packets and the second plurality of data packets, until the buffer is full; and storing the first set of data packets to the disk memory when the meta data for each data packet in the first set of data packets indicates only one encoding scheme for the payload data.

2. The method of claim 1 wherein the buffer stores a set number of data packets; and wherein the method further comprises:

storing a second set of data packets in the buffer from the series of data packets, wherein data packets from the second set of data packets are received after data packets the first set of data packets; and storing the second set of data packets to the disk memory when the meta data for each data packet in the second set of data packets indicates only one encoding scheme for the payload data.

3. The method of claim 2 wherein the meta data for data packets in the second set of data packets indicates payload data in the first encoding scheme and the second encoding scheme; and wherein the second set of data packets is not stored to the disk memory.

4. The method of claim 1 wherein each data packet in the first set of data packets indicates only the first encoding scheme; and wherein the first set of data packets is stored to the disk memory.

5. The method of claim 1 further comprising:

sending a request to the upstream server for data packets in the second encoding scheme.

6. The method of claim 1 wherein storing the first set of data packets in the buffer comprises storing data packets from the series of data packets based upon data packet presentation time, in the buffer, until the buffer is full.

7. The method of claim 1 further comprising
sending the first plurality of data packets to a downstream client, and
sending the second plurality of data packets to the downstream client.

8. A streaming media cache
a buffer configured to receive a first plurality of data packets from a media server, the data packets comprising payload data and meta data, wherein the meta data for each data packet from the first plurality of data packets indicate a first encoding scheme for the payload data, wherein the buffer is also configured to receive the second plurality of data packets from the media server, wherein the meta data for each data packet from the second plurality of data packets indicate a second encoding scheme for the payload data, and wherein the buffer is configured to store a first set of data packets from a series of data packets comprising the first plurality of data packets and the second plurality of data packets; and
a disk memory configured to store the first set of data packets from the buffer when the meta data for each data packet in the first set of data packets indicates only one encoding scheme for the payload data in the first set of data packets.

9. The streaming media cache of claim 8 wherein the buffer is configured to store a set number of data packets;
wherein the buffer is also configured to store a second set of data packets from the series of data packets, wherein data packets from the second set of data packets have presentation time stamps later than data packets the first set of data packets; and
wherein the disk memory is configured to store the second set of data packets when the meta data for each data packet in the second set of data packets indicates only one encoding scheme for the payload data in the second set of data packets.

10. The streaming media cache of claim 9
wherein the meta data for data packets in the second set of data packets indicates payload data in the first encoding scheme and in the second encoding scheme.

11. The streaming media cache of claim 8
wherein each data packet in the first set of data packets indicates only the first encoding scheme or only the second encoding scheme.

12. The streaming media cache of claim 8 wherein the first encoding scheme and the second encoding scheme have different bit rates.

13. The streaming media cache of claim 8 further comprising a indicator unit configured to determine whether the disk memory stores the second plurality of data packets.

14. The streaming media cache of claim 8 further comprising an output portion configured to stream the first plurality of data packets to a client system and configured to stream the second plurality of data packets to the client system.

15. A method comprising:
receiving a set of related data in a plurality of encoding formats; and
storing the set of related data to a mass storage facility in a plurality of chunks, such that each chunk includes a portion of the set of related data, such that within each of the chunks all of the data have the same encoding format, and such that the data in at least one chunk of the plurality of chunks have a different encoding format from the data in at least one other chunk of the plurality of chunks.

16. The method of claim 15 wherein the encoding formats have different parameters selected from the group: bit rate, bit depth, thinning parameters and output resolution.

17. The method of claim 15, wherein the method is implemented within a Processing system that includes the mass storage facility, and wherein a chunk of data packets stored into the mass storage facility is directly accessible by a file system of the processing system.

18. The method of claim 15, wherein the set of related data is a set of streaming media data.

19. The method of claim 15, wherein the set of related data comprises a plurality of data packets.

20. The method of claim 15, wherein the set of related data comprises a plurality of streaming data packets.

21. The method of claims 20 further comprising:
sending a request for streaming media data packets in a first encoding format to an upstream server; and
sending a request for streaming media data packets in a second encoding format to the upstream server.

22. A network caching device comprising:
a processor;
a network interface through which to communicate with a server and a client;
a mass storage facility; and
a memory storing instructions which, when executed by the processor, cause the network caching device to perform a process that includes
receiving a set of related streaming media data in a plurality of encoding formats from the server, for delivery to the client, and
storing the set of related streaming media data to the mass storage facility in a plurality of chunks, each of the chunks including a portion of the received set of related streaming media data, such that within each of the chunks all of the streaming media data have the same encoding format, and such that the streaming media data in at least one chunk of the plurality of chunks have a different encoding format from the streaming media data in at least one other chunk of the plurality of chunks.

23. The network caching device of claim 22, wherein the streaming media data received from the server comprises a plurality of data packets.

24. An apparatus comprising:
means for receiving a set of related streaming media data in a plurality of encoding formats from a server; and
means for storing the set of related streaming media data to a mass storage facility in a plurality of chunks, each of the chunks including a portion of the received set of related streaming media data, such that within each of the chunks all of the streaming media data have the same encoding format, and such that the streaming media data in at least one chunk of the plurality of chunks have a different encoding format from the streaming media data in at least one other chunk of the plurality of chunks.

* * * * *